US008510181B2

(12) United States Patent
Creedle et al.

(10) Patent No.: US 8,510,181 B2
(45) Date of Patent: Aug. 13, 2013

(54) ADMINISTERING A CONTRACT OVER A DATA NETWORK

(75) Inventors: Sherwood Creedle, South Hill, VA (US); Michael W. Petersen, Richmond, VA (US); Tom Obermeyer, Richmond, VA (US); Eric Kukanic, Richmond, VA (US)

(73) Assignee: Hart Business Solutions, L.L.C., South Hill, VA (US)

( * ) Notice: Subject to any disclaimer, the term of this patent is extended or adjusted under 35 U.S.C. 154(b) by 3558 days.

(21) Appl. No.: 10/673,142

(22) Filed: Sep. 30, 2003

(65) Prior Publication Data

US 2007/0288334 A1 Dec. 13, 2007

Related U.S. Application Data

(60) Provisional application No. 60/415,762, filed on Oct. 4, 2002.

(51) Int. Cl.
*G07B 17/00* (2006.01)

(52) U.S. Cl.
USPC .................................. 705/30; 705/35; 705/29

(58) Field of Classification Search
USPC ................................................ 705/29, 30, 35
See application file for complete search history.

(56) References Cited

U.S. PATENT DOCUMENTS 5,189,606 A 2/1993 Burns et al.
5,689,705 A 11/1997 Fino et al.
5,761,674 A 6/1998 Ito
5,799,286 A 8/1998 Morgan et al.
5,893,082 A 4/1999 McCormick
5,926,816 A 7/1999 Bauer et al.
5,950,206 A 9/1999 Krause
5,991,769 A 11/1999 Fino et al.
6,038,547 A 3/2000 Casto
6,076,080 A 6/2000 Morscheck et al.
6,078,907 A 6/2000 Lamm
6,393,410 B1 5/2002 Thompson
6,446,053 B1 9/2002 Elliott
7,330,822 B1 2/2008 Robson et al.
2002/0016725 A1 2/2002 Eichstaedt et al.

(Continued)

OTHER PUBLICATIONS

"Primavera Launches PrimeContract for the Construction Industry; PrimeContract Streamlines E-Commerce, Collaboration and Project Control via the Internet", Nov. 29, 2001, Business Wire, pp. 1-3.*

(Continued)

*Primary Examiner* — Carrie Gilkey
(74) *Attorney, Agent, or Firm* — Volentine & Whitt, PLLC

(57) ABSTRACT

A computer-based method for administering performance of a contract uses a server accessible by multiple performing parties through a data network, such as the Internet. The method includes receiving performance data at the server from at least one of the performing parties through the data network. The performance data indicates an amount of work performed under the contract by the performing party, and may further include an amount of materials stored. A payment amount is determined based on the performance data. A schedule of values associated with performance of the contract may be initially stored, so that determining the payment amount is further based on comparing the performance data with the schedule of values. The payment amount is sent from the server to other performing parties through the data network. The other performing parties may be notified by an email indicating, for example, that the payment amount has been approved.

17 Claims, 14 Drawing Sheets

Subcontractor AFP

(56) References Cited

U.S. PATENT DOCUMENTS

| | | | |
|---|---|---|---|
| 2002/0073114 A1 | 6/2002 | Nicastro et al. |
| 2004/0015367 A1 | 1/2004 | Nicastro et al. |
| 2005/0289051 A1 | 12/2005 | Allin et al. |
| 2007/0078771 A1 | 4/2007 | Allin et al. |
| 2007/0265962 A1 | 11/2007 | Bowe, Jr. et al. |

OTHER PUBLICATIONS

Primavera PrimeContract Brochure, Sep. 25, 2001, Primavera, pp. 1-3.*

New York State Office of the State Comptroller, Bulletin No. A-191 R1, Oct. 18, 1999, pp. 1-2.*

*SK Drywall* v. *Developers Financial*, Nov. 8, 1991, Arizona Business Gazette, p. 52.*

CREDO Reference, Definition of Proxy, Oct. 1, 2007.*

"PrimeContract Goes Live and the World According to Joel Koppelman", Nov. 30, 2000, Construction.com, pp. 1-3.*

Power Point presentation of Hart Business Solutions, presents GCPAY.

"e-Builder Enterprise™," www.e-builder.net (downloaded Nov. 15, 2004).

"Meridan Systems—Products," www.mps.com (downloaded Nov. 15, 2004).

"PrimeContract: The Future Construction," www.primavera.com (2001).

"Primavera and PurchasePro.com Create E-Commerce Marketplace: PrimeContract.com links contractors, owners and suppliers for trading of materials, supplies and services," Dialog NewsRoom, Dialog File No. 995 Accession No. 1044114 (Jan. 1, 2000).

"Primavera PrimeContract Provides Construction Industry with Revolutionary Progress Payment and Negotiation Capabilities—Upgraded Version of Progress Payments Speeds Payment Requisition Consolidation," Dialog NewsRoom, Dialog File No. 994 Accession No. 353515951 (Nov. 13, 2001).

Non-Office Action dated Aug. 5, 2010 for U.S. Appl. No. 12/137,680.

Final Office Action dated Dec. 24, 2009 for U.S. Appl. No. 11/927,961.

Non-Final Office Action dated Jul. 25, 2011 for U.S. Appl. No. 11/927,961.

Final Office Action dated Jan. 5, 2012 for U.S. Appl. No. 11/927,961.

Non-Final Office Action dated Sep. 11, 2012 for U.S. Appl. No. 11/927,961.

Final Office Action dated Apr. 3, 2013 for U.S. Appl. No. 11/927,961.

* cited by examiner

Fig. 3 - Create Project

Fig. 4 - SOV

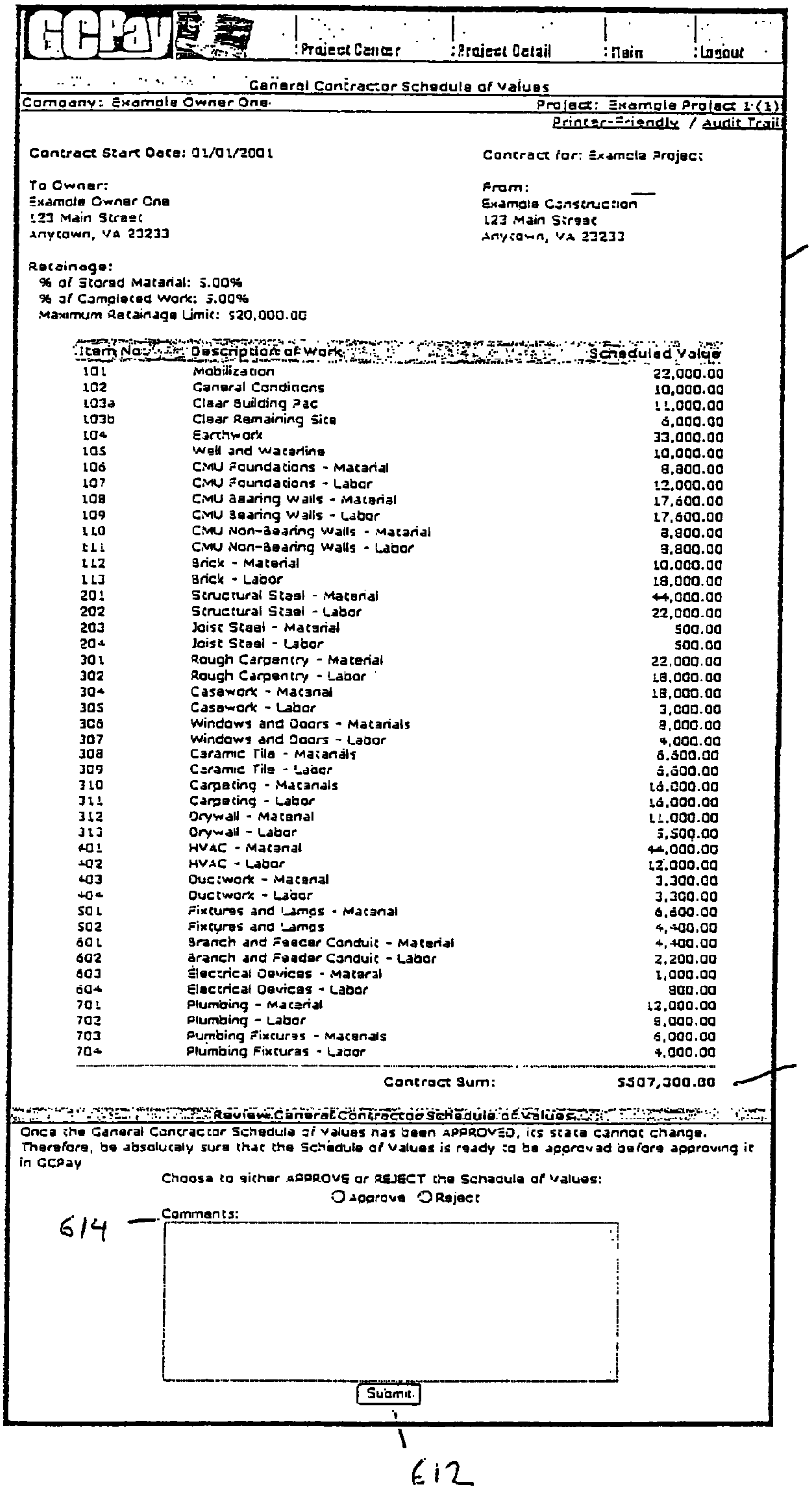

GCPay | Project Center | Project Detail | Main | Logout

General Contractor Schedule of Values

Company: Example Owner One — Project: Example Project 1 (1)

Printer-Friendly / Audit Trail

Contract Start Date: 01/01/2001 — Contract for: Example Project

To Owner:
Example Owner One
123 Main Street
Anytown, VA 23233

From:
Example Construction
123 Main Street
Anytown, VA 23233

Retainage:
% of Stored Material: 5.00%
% of Completed Work: 5.00%
Maximum Retainage Limit: $20,000.00

| Item No. | Description of Work | Scheduled Value |
|---|---|---|
| 101 | Mobilization | 22,000.00 |
| 102 | General Conditions | 10,000.00 |
| 103a | Clear Building Pad | 11,000.00 |
| 103b | Clear Remaining Site | 6,000.00 |
| 104 | Earthwork | 33,000.00 |
| 105 | Well and Waterline | 10,000.00 |
| 106 | CMU Foundations - Material | 8,800.00 |
| 107 | CMU Foundations - Labor | 12,000.00 |
| 108 | CMU Bearing Walls - Material | 17,600.00 |
| 109 | CMU Bearing Walls - Labor | 17,600.00 |
| 110 | CMU Non-Bearing Walls - Material | 8,800.00 |
| 111 | CMU Non-Bearing Walls - Labor | 8,800.00 |
| 112 | Brick - Material | 10,000.00 |
| 113 | Brick - Labor | 18,000.00 |
| 201 | Structural Steel - Material | 44,000.00 |
| 202 | Structural Steel - Labor | 22,000.00 |
| 203 | Joist Steel - Material | 500.00 |
| 204 | Joist Steel - Labor | 500.00 |
| 301 | Rough Carpentry - Material | 22,000.00 |
| 302 | Rough Carpentry - Labor | 18,000.00 |
| 304 | Casework - Material | 18,000.00 |
| 305 | Casework - Labor | 3,000.00 |
| 306 | Windows and Doors - Materials | 8,000.00 |
| 307 | Windows and Doors - Labor | 4,000.00 |
| 308 | Ceramic Tile - Materials | 6,600.00 |
| 309 | Ceramic Tile - Labor | 6,600.00 |
| 310 | Carpeting - Materials | 16,000.00 |
| 311 | Carpeting - Labor | 16,000.00 |
| 312 | Drywall - Material | 11,000.00 |
| 313 | Drywall - Labor | 5,500.00 |
| 401 | HVAC - Material | 44,000.00 |
| 402 | HVAC - Labor | 12,000.00 |
| 403 | Ductwork - Material | 3,300.00 |
| 404 | Ductwork - Labor | 3,300.00 |
| 501 | Fixtures and Lamps - Material | 6,600.00 |
| 502 | Fixtures and Lamps | 4,400.00 |
| 601 | Branch and Feeder Conduit - Material | 4,400.00 |
| 602 | Branch and Feeder Conduit - Labor | 2,200.00 |
| 603 | Electrical Devices - Material | 1,000.00 |
| 604 | Electrical Devices - Labor | 900.00 |
| 701 | Plumbing - Material | 12,000.00 |
| 702 | Plumbing - Labor | 9,000.00 |
| 703 | Plumbing Fixtures - Materials | 6,000.00 |
| 704 | Plumbing Fixtures - Labor | 4,000.00 |
| | Contract Sum: | $507,300.00 |

Review General Contractor Schedule of Values

Once the General Contractor Schedule of Values has been APPROVED, its state cannot change. Therefore, be absolutely sure that the Schedule of Values is ready to be approved before approving it in GCPay Choose to either APPROVE or REJECT the Schedule of Values:

○ Approve ○ Reject

Comments:

Submit

FIG. 6

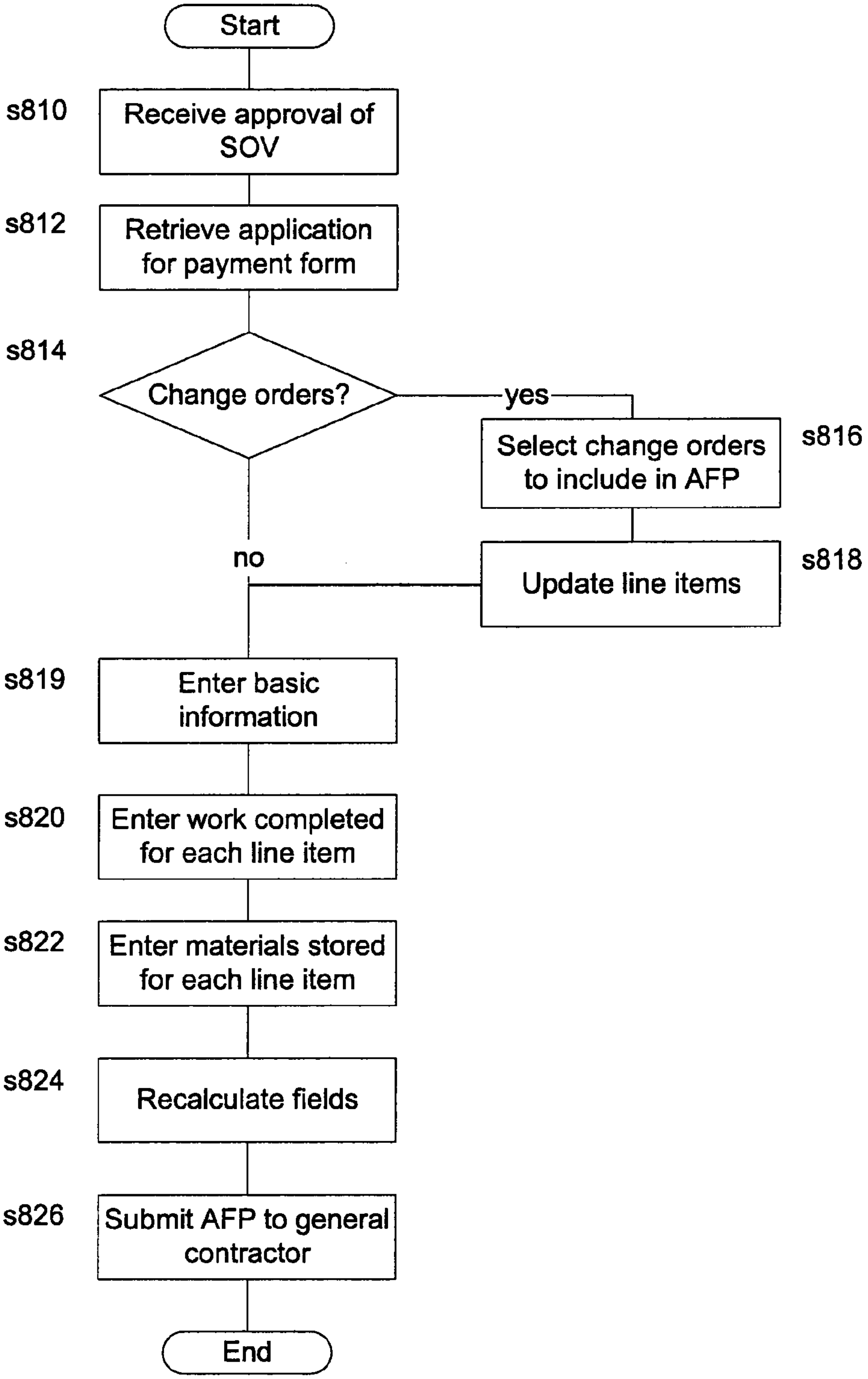
Fig. 8 - Subcontractor AFP

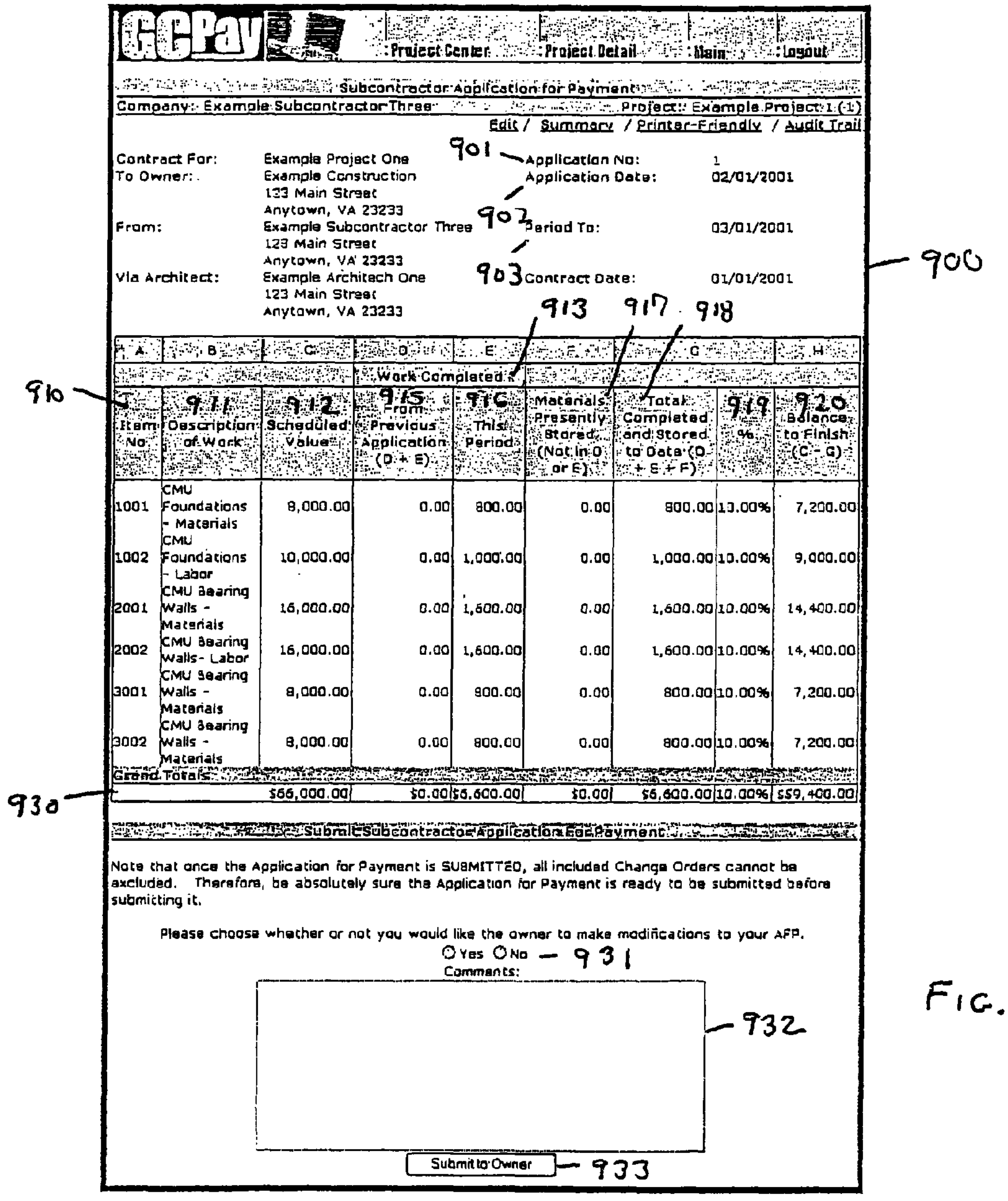

Subcontractor Application for Payment

Company: Example Subcontractor Three    Project: Example Project 1 (1)

Edit / Summary / Printer-Friendly / Audit Trail

| | | | |
|---|---|---|---|
| Contract For: | Example Project One | Application No: | 1 |
| To Owner: | Example Construction<br>123 Main Street<br>Anytown, VA 23233 | Application Date: | 02/01/2001 |
| From: | Example Subcontractor Three<br>123 Main Street<br>Anytown, VA 23233 | Period To: | 03/01/2001 |
| Via Architect: | Example Architech One<br>123 Main Street<br>Anytown, VA 23233 | Contract Date: | 01/01/2001 |

| A | B | C | D | E | F | G | | H |
|---|---|---|---|---|---|---|---|---|
| | | | Work Completed | | | | | |
| Item No | Description of Work | Scheduled Value | From Previous Application (D + E) | This Period | Materials Presently Stored (Not in D or E) | Total Completed and Stored to Date (D + E + F) | % | Balance to Finish (C - G) |
| 1001 | CMU Foundations - Materials | 8,000.00 | 0.00 | 800.00 | 0.00 | 800.00 | 10.00% | 7,200.00 |
| 1002 | CMU Foundations - Labor | 10,000.00 | 0.00 | 1,000.00 | 0.00 | 1,000.00 | 10.00% | 9,000.00 |
| 2001 | CMU Bearing Walls - Materials | 16,000.00 | 0.00 | 1,600.00 | 0.00 | 1,600.00 | 10.00% | 14,400.00 |
| 2002 | CMU Bearing Walls- Labor | 16,000.00 | 0.00 | 1,600.00 | 0.00 | 1,600.00 | 10.00% | 14,400.00 |
| 3001 | CMU Bearing Walls - Materials | 8,000.00 | 0.00 | 800.00 | 0.00 | 800.00 | 10.00% | 7,200.00 |
| 3002 | CMU Bearing Walls - Materials | 8,000.00 | 0.00 | 800.00 | 0.00 | 800.00 | 10.00% | 7,200.00 |
| Grand Totals: | | | | | | | | |
| | | $66,000.00 | $0.00 | $6,600.00 | $0.00 | $6,600.00 | 10.00% | $59,400.00 |

Submit Subcontractor Application For Payment

Note that once the Application for Payment is SUBMITTED, all included Change Orders cannot be excluded. Therefore, be absolutely sure the Application for Payment is ready to be submitted before submitting it.

Please choose whether or not you would like the owner to make modifications to your AFP.

○ Yes ○ No

Comments:

Submit to Owner

FIG. 9

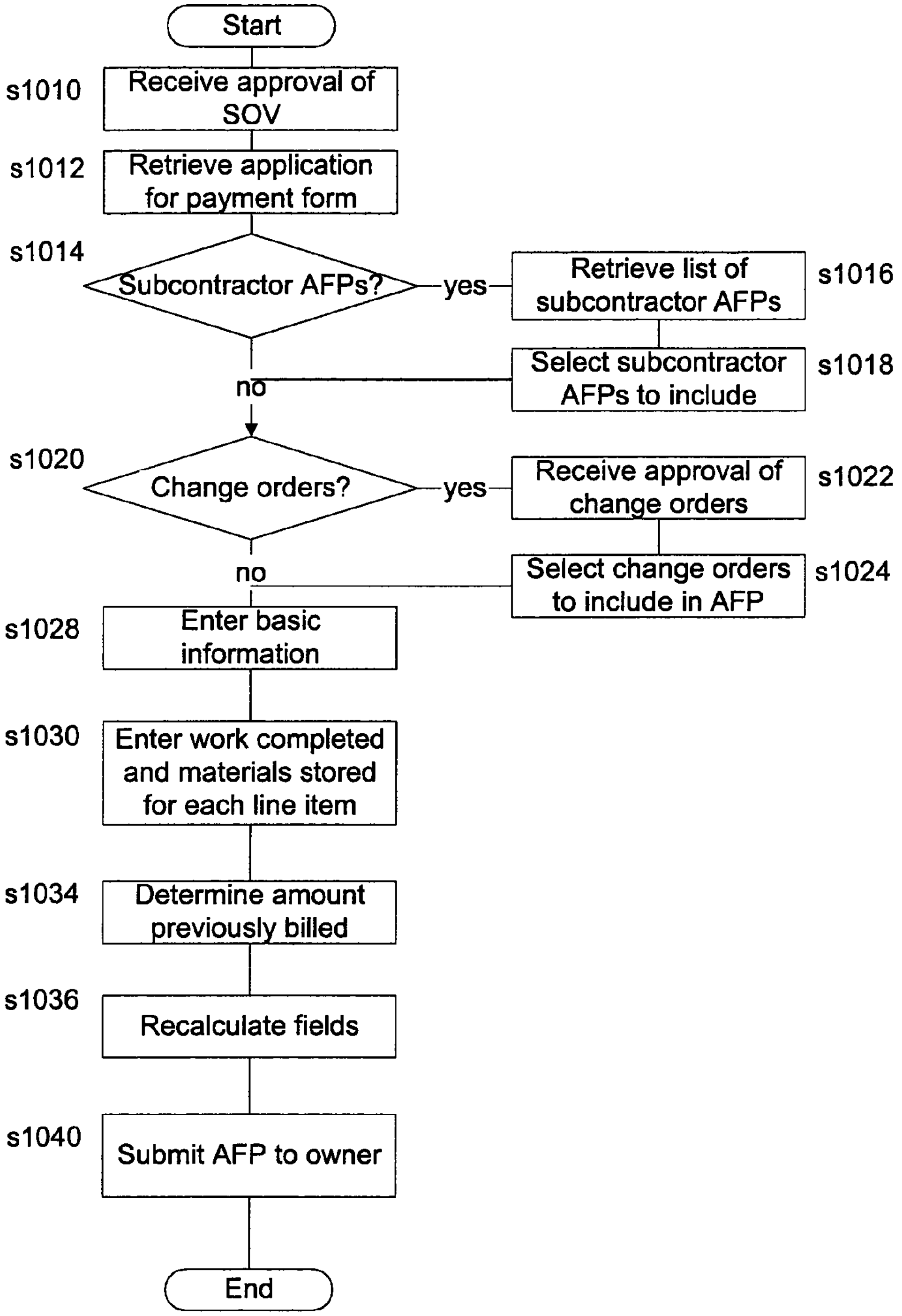
Fig. 10 - General Contractor AFP

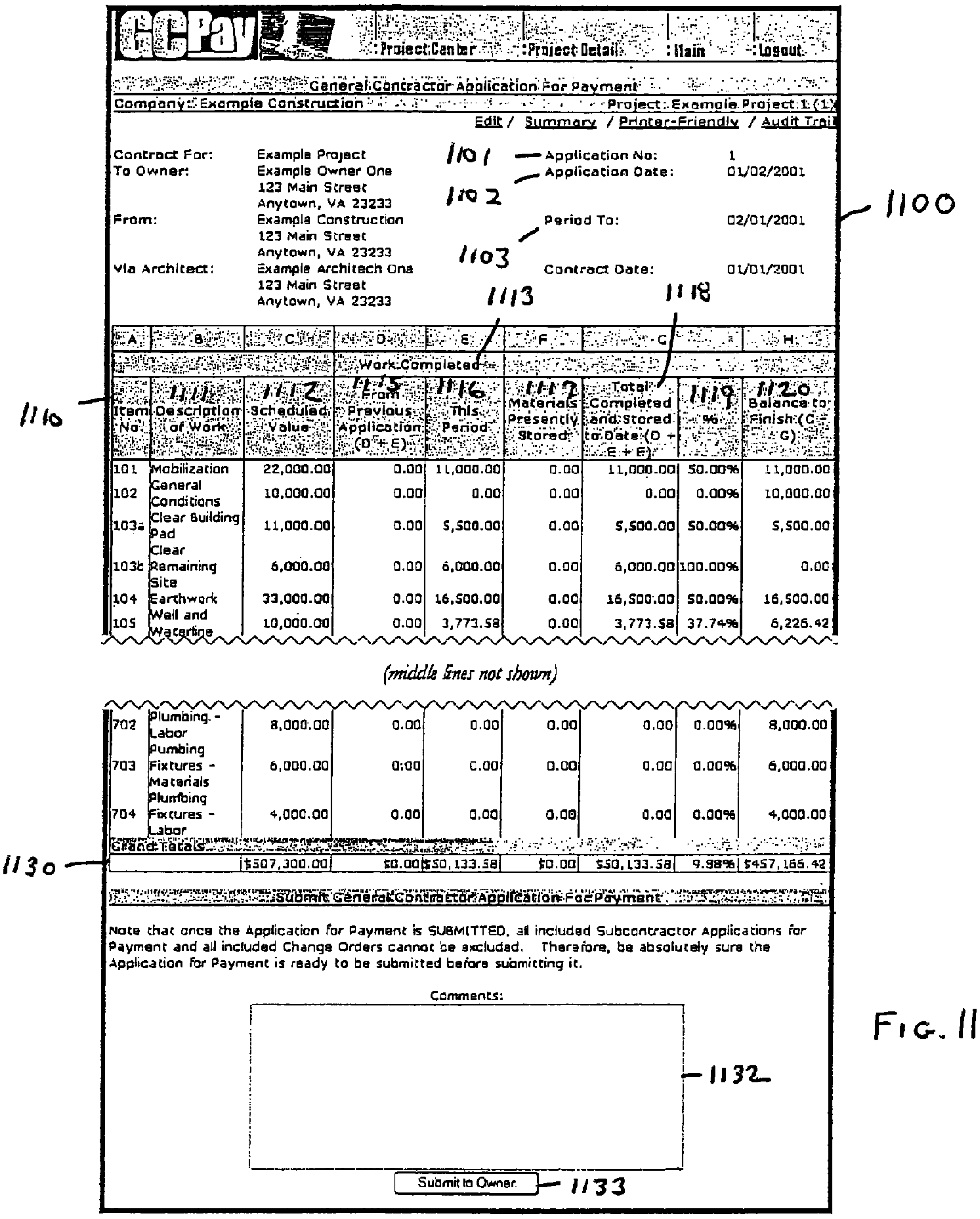

FIG. 11

| | | | | | | | |
|---|---|---|---|---|---|---|---|
| | | | | Work Completed | | | |
| Item No. | Description of Work | Scheduled Value | From Previous Application (D + E) | This Period | Materials Presently Stored | Total Completed and Stored to Date (D + E + F) | % | Balance to Finish (C – G) |
| 101 | Mobilization | 22,000.00 | 0.00 | 11,000.00 | 0.00 | 11,000.00 | 50.00% | 11,000.00 |
| 102 | General Conditions | 10,000.00 | 0.00 | 0.00 | 0.00 | 0.00 | 0.00% | 10,000.00 |
| 103a | Clear Building Pad | 11,000.00 | 0.00 | 5,500.00 | 0.00 | 5,500.00 | 50.00% | 5,500.00 |
| 103b | Clear Remaining Site | 6,000.00 | 0.00 | 6,000.00 | 0.00 | 6,000.00 | 100.00% | 0.00 |
| 104 | Earthwork | 33,000.00 | 0.00 | 16,500.00 | 0.00 | 16,500.00 | 50.00% | 16,500.00 |
| 105 | Well and Waterline | 10,000.00 | 0.00 | 3,773.58 | 0.00 | 3,773.58 | 37.74% | 6,226.42 |

*(middle lines not shown)*

| | | | | | | | |
|---|---|---|---|---|---|---|---|
| 702 | Plumbing - Labor | 8,000.00 | 0.00 | 0.00 | 0.00 | 0.00 | 0.00% | 8,000.00 |
| 703 | Plumbing Fixtures - Materials | 6,000.00 | 0.00 | 0.00 | 0.00 | 0.00 | 0.00% | 6,000.00 |
| 704 | Plumbing Fixtures - Labor | 4,000.00 | 0.00 | 0.00 | 0.00 | 0.00 | 0.00% | 4,000.00 |
| Grand Totals | | $507,300.00 | $0.00 | $50,133.58 | $0.00 | $50,133.58 | 9.88% | $457,166.42 |

Submit General Contractor Application For Payment

Note that once the Application for Payment is SUBMITTED, all included Subcontractor Applications for Payment and all included Change Orders cannot be excluded. Therefore, be absolutely sure the Application for Payment is ready to be submitted before submitting it.

Comments:

[ Submit to Owner ]

1210

SC - First Application for Payment

| A | B | C | D | E | F | G | | H | I |
|---|---|---|---|---|---|---|---|---|---|
| | | | WORK COMPLETED | | | | | | |
| ITEM | DESCRIPTION | SCHEDULED VALUE | FROM PREVIOUS APPLICATION (D + E) | THIS PERIOD | MATERIALS PRESENTLY STORED (NOT IN D OR E) | TOTAL COMPLETED AND STORED TO DATE (D + E + F) | % (G/C) | BALANCE TO FINISH (C - G) | RETAINAGE (IF VARIABLE RATE) |
| 1 | Copper Pipe | 10,000.00 | 0.00 | 3,000.00 | 2,000.00 | 5,000.00 | 50.00% | 5,000.00 | |
| 2 | PVC Pipe | 8,000.00 | 0.00 | 500.00 | 500.00 | 1,000.00 | 12.50% | 7,000.00 | |
| 3 | Labor | 12,000.00 | 0.00 | 4,000.00 | 0.00 | 4,000.00 | 33.33% | 8,000.00 | |
| | | 30,000.00 | 0.00 | 7,500.00 | 2,500.00 | 10,000.00 | 33.33% | 20,000.00 | |

1230

GC - First Application for Payment

| A | B | C | D | E | F | G | | H | I |
|---|---|---|---|---|---|---|---|---|---|
| | | | WORK COMPLETED | | | | | | |
| ITEM | DESCRIPTION | SCHEDULED VALUE | FROM PREVIOUS APPLICATION (D + E) | THIS PERIOD | MATERIALS PRESENTLY STORED (NOT IN D OR E) | TOTAL COMPLETED AND STORED TO DATE (D + E + F) | % (G/C) | BALANCE TO FINISH (C - G) | RETAINAGE (IF VARIABLE RATE) |
| 100 | Plumbing | 33,000.00 | 0.00 | 8,250.00 | 2,750.00 | 11,000.00 | 33.33% | 22,000.00 | |
| | | | | | | | | | |
| | | | | | | | | | |

SC - Second Application for Payment

| A | B | C | D | E | F | G | | H | I |
|---|---|---|---|---|---|---|---|---|---|
| | | | WORK COMPLETED | | | | | | |
| ITEM | DESCRIPTION | SCHEDULED VALUE | FROM PREVIOUS APPLICATION (D + E) | THIS PERIOD | MATERIALS PRESENTLY STORED (NOT IN D OR E) | TOTAL COMPLETED AND STORED TO DATE (D + E + F) | % (G/C) | BALANCE TO FINISH (C - G) | RETAINAGE (IF VARIABLE RATE) |
| 1 | Copper Pipe | 10,000.00 | 3,000.00 | 3,000.00 | 2,000.00 | 8,000.00 | 80.00% | 2,000.00 | |
| 2 | PVC Pipe | 8,000.00 | 500.00 | 4,000.00 | 500.00 | 5,000.00 | 62.50% | 3,000.00 | |
| 3 | Labor | 12,000.00 | 4,000.00 | 4,000.00 | 0.00 | 8,000.00 | 66.67% | 4,000.00 | |
| | | 30,000.00 | 7,500.00 | 11,000.00 | 2,500.00 | 21,000.00 | 70.00% | 9,000.00 | |

1260

GC - Second Application for Payment

| A | B | C | D | E | F | G | | H | I |
|---|---|---|---|---|---|---|---|---|---|
| | | | WORK COMPLETED | | | | | | |
| ITEM | DESCRIPTION | SCHEDULED VALUE | FROM PREVIOUS APPLICATION (D + E) | THIS PERIOD | MATERIALS PRESENTLY STORED (NOT IN D OR E) | TOTAL COMPLETED AND STORED TO DATE (D + E + F) | % (G/C) | BALANCE TO FINISH (C - G) | RETAINAGE (IF VARIABLE RATE) |
| 100 | Plumbing | 33,000.00 | 12,000.00 | 10,266.67 | 2,750.00 | 25,016.67 | 75.81% | 7,983.33 | |
| | | | | | | | | | |
| | | | | | | | | | |

SC - Third Application for Payment

| A | B | C | D | E | F | G | | H | I |
|---|---|---|---|---|---|---|---|---|---|
| | | | WORK COMPLETED | | | | | | |
| ITEM | DESCRIPTION | SCHEDULED VALUE | FROM PREVIOUS APPLICATION (D + E) | THIS PERIOD | MATERIALS PRESENTLY STORED (NOT IN D OR E) | TOTAL COMPLETED AND STORED TO DATE (D + E + F) | % (G/C) | BALANCE TO FINISH (C - G) | RETAINAGE (IF VARIABLE RATE) |
| 1 | Copper Pipe | 10,000.00 | 6,000.00 | 4,000.00 | 0.00 | 10,000.00 | 100.00% | 0.00 | |
| 2 | PVC Pipe | 8,000.00 | 4,500.00 | 3,500.00 | 0.00 | 8,000.00 | 100.00% | 0.00 | |
| 3 | Labor | 12,000.00 | 8,000.00 | 4,000.00 | 0.00 | 12,000.00 | 100.00% | 0.00 | |
| | | 30,000.00 | 18,500.00 | 11,500.00 | 0.00 | 30,000.00 | | 0.00 | |

1290

GC - Third Application for Payment

| A | B | C | D | E | F | G | | H | I |
|---|---|---|---|---|---|---|---|---|---|
| | | | WORK COMPLETED | | | | | | |
| ITEM | DESCRIPTION | SCHEDULED VALUE | FROM PREVIOUS APPLICATION (D + E) | THIS PERIOD | MATERIALS PRESENTLY STORED (NOT IN D OR E) | TOTAL COMPLETED AND STORED TO DATE (D + E + F) | % (G/C) | BALANCE TO FINISH (C - G) | RETAINAGE (IF VARIABLE RATE) |
| 100 | Plumbing | 33,000.00 | 22,266.67 | 10,733.33 | 0.00 | 33,000.00 | 100.00% | 0.00 | |
| | | | | | | | | | |
| | | | | | | | | | |

Fig 12C

ADMINISTERING A CONTRACT OVER A DATA NETWORK

This application claims priority of U.S. Provisional Patent Application No. 60/415,762, filed on Oct. 4, 2002, the disclosure of which is expressly incorporated by reference herein in its entirety.

BACKGROUND OF THE INVENTION

1. Field of the Invention

The present invention relates to the field of contract administration. More particularly, the present invention relates to efficiently administering a construction contract using the Internet or other commonly accessible data network.

2. Background Information

Administration of a construction contract is a difficult and time consuming task. Typically, the efficiency with which a contract is administered means the difference between a profitable and unprofitable contract performance, especially from the point of view of the general contractor.

The traditional roles involved in procurement and construction of building and other structures include the owner, the architect, the general contractor and the subcontractor. The architect creates the design of the building or structure through a separate contract with the owner. The design and specification of the project are necessarily quite detailed to enable competing entities to accurately prepare estimates for performing the work and to assure the integrity of the finished structure with respect to the conceptualization. The architect will also normally act as a liaison between the owner and the general contractor, assuring that the project is proceeding and payments are made according to the contract. The architect is also responsible for approving any change orders that are submitted for review by the general contractor over the course of the project.

The general contractor is typically selected by the owner and/or architect through a competitive bidding process based on the detailed design of the project. Each prospective general contractor elicits bids or proposals from subcontractors specializing in areas of contract performance, such as site preparation, plumbing, electrical, masonry, roofing and the like. The general contractor prepares its bid or proposal generally using the subcontractors' estimates, together with its administrative overhead and a percentage markup. Typically, the proposal includes an itemized list or schedule of tasks to be accomplished in furtherance of the project, known as line items. The subcontractors likewise prepare their estimates, based on the design documents provided by the architect, by determining materials and labor needed to accomplish the tasks specific to their respective specialties. The subcontractors also factor in their administrative overhead and percentage markup, and provide their proposed schedule in the form of line items. The subcontractor line items do not generally match the general contractor line items, although each of the subcontractor line items must fit within a line item proposed by the general contractor. Possibly, all of a particular subcontractor's proposed labor, materials, overhead and markup may fall within a single line item of the general contractor.

The owner and/or architect awards the contract to the most desirable general contractor, based on any number of factors. For example, the award may be based solely on the lowest bid of a qualified general contractor. Alternatively, the award decision may include consideration of a weighted combination of factors, including price, experience, references, time availability, or any other factor deemed significant by the owner and/or architect. The selected general contractor then enters a contract with the owner and/or architect, essentially committing the general contractor to the proposed price and schedule. The general contractor in turn contracts with each of its subcontractors to commit them to their respective prices and schedules.

As work on the project under the contract proceeds, periodic payments are made to the general contractor and the subcontractors. The progress of the project and the corresponding payments are closely tracked to assure that the owner is not paying for work that has not yet been performed (unless the owner has agreed to allow the general contractor to "frontload" progress payments, as discussed below) and that the general contractor and the subcontractors are being paid for work that has been performed. Tracking the progress is complicated by the fact that dozens of subcontractors, whose activities are coordinated by the general contractor, are performing integrated tasks at various stages of completion. Each request for payment, each change order request, each payment, and their effects on the status of the overall project presents a significant accounting challenge. Further, contracts often provide for retainage, which is a predetermined percentage of payments held back or retained by the owner until the project has been completed to its satisfaction. Therefore, the amount of payments likewise needs to be accurately tracked to protect the agreed upon retainage amount.

Computer programs have been developed to assist owners, architects and/or general contractors track progress and status of construction projects. However, these programs rely on conventional submission of payment requests and require manual data entry in order to function properly. There currently is no efficient way in which the various contracting parties can efficiently communicate and exchange data relating to the status of contract performance, submission and approval of payment requests, submission and approval of change orders, and the like.

The present invention overcomes the problems associated with the prior art, as described below.

SUMMARY OF THE INVENTION

The present invention relates to a computer-based method for administering a construction contract, in which all parties to the contract (and any associated subcontracts) access a common server over a data network, such as the Internet, and provide contract schedules and requests for payment based on performance of work in accordance of the schedules.

In view of the above, the present invention through one or more of its various aspects and/or embodiments is presented to accomplish one or more objectives and advantages, such as those noted below.

An aspect of the present invention provides a method for administering performance of a contract using a server accessible by performing parties through a data network, which may include a public Internet. The method includes receiving performance data at the server from at least one of the performing parties through the data network, the performance data indicating an amount of work performed under the contract by the at least one performing party. A payment amount is determined based on the performance data. The performance data may further include an amount of materials stored.

The method may further include initially storing a schedule of values associated with performance of the contract, so that determining the payment amount is further based on comparing the performance data with the schedule of values. Also, the method may further include calculating a contract markup amount based on the performance data and determining the payment further based on the contract markup amount. The payment amount may be sent from the server to another one of the performing parties through the data network. Also, an electronic message may be sent to another one of the performing parties indicating that the payment amount has been determined. A request may be received from the messaged party to receive the payment amount through the data network.

Another aspect of the present invention provides a method for administering performance of a contract, including receiving at a server, through a data network, schedules corresponding to subcontractors performing work under the contract. Each schedule identifies at least one task to be performed by the corresponding subcontractor and a cost associated with each task. The method further includes receiving at the server, through the data network, an application for payment corresponding to one of the schedules. The application for payment identifies a portion of the at least one task completed by the corresponding subcontractor. At least one of an amount of work completed and an amount of payment to the subcontractor is determined based on comparing the application for payment and the corresponding schedule. In an embodiment, the data network is a public Internet.

The method for administering performance of the contract may also include receiving at the server a change order request associated with the at least one task and a change order approval approving the change order request. Determining at least one of the amount of work completed and the amount of payment to the subcontractor is then further based on the approved change order. Also, determining the amount of payment may be further based on subtracting a retainage amount, which is a predetermined percentage applied to the application for payment.

Another aspect of the present invention provides a method for administering performance of a project using a web server accessible through a packet switched data network, which may be the Internet. The method includes creating a general contract schedule of values relating to the project, the general contract schedule of values including general contract line items. At least one subcontract schedule of values is received through the packet switched data network. The subcontract schedule of values includes subcontract line items. Associations between the subcontract line items of each subcontract schedule of values and the general contract line items of the general contract schedule of values are received. At least one subcontract application for payment is then received through the packet switched data network, the subcontract application for payment including the subcontract line items. The general contract line items are updated based on information in the associated subcontract line items received in the subcontract application for payment. A general contract application for payment is created based on the updated contract line items. The general contract application for payment automatically determines a total performed work amount and a payment amount due based on the total completed work amount.

The method for administering performance of the project may further include submitting the general contract application for payment through the packet switched data network. An approval of the general contract application for payment is received through the packet switched data network. The method may further include initially creating a project profile and assigning roles to participants, including the at least one subcontractor and at least one of an owner or an architect. Assigning roles includes selecting at least one of the participants from a database accessible by the web server. Also, assigning roles may include identifying a proxy to represent the at least one of the participants, so that the subcontract schedule of values and the subcontract application for payment are received from the proxy.

The method may further include basing the subcontract schedule of values on a predetermined template accessible through the packet switched data network. Creating the general contract application for payment may be further based on a change order corresponding to at least one of the general contract schedule of values and the at least one subcontract schedule of values. Also, creating the general contract application for payment may include entering at least one of a work completed amount and a material presently stored amount. Entering at least one of the work completed amount and the material presently stored amount may be performed automatically based on the subcontract application for payment. Or, entering at least one of the work completed amount and the material presently stored amount may include receiving a dictated amount, different than the at least one of the work completed amount and the material presently stored amount, through the packet switched data network. The received subcontractor application for payment may be modified before updating the general contract line items, based on permission to modify the received subcontractor application received through the packet switched data network.

Yet another aspect of the present invention provides a computer readable medium storing a computer program for administering performance of a contract, the computer program being executed by a server accessible through a data network. The computer readable medium includes a schedule source code segment, a payment application source code segment and a determining source code segment. The schedule source code segment receives schedules corresponding to subcontractors performing work under the contract, each schedule identifying at least one task to be performed by the corresponding subcontractor and a cost associated with each task. The payment application source code segment receives an application for payment corresponding to one of the schedules, the application for payment identifying a portion of the at least one task completed by the corresponding subcontractor. The determining source code segment determines at least one of an amount of work completed and an amount of payment to the subcontractor based on comparing the application for payment and the corresponding schedule. The data network may be an Internet.

The computer readable medium may further include a change order source code segment that receives a change order request associated with the at least one task and that modifies the corresponding schedule in accordance with the change order request, when the change order request is approved. Determining at least one of the amount of work performed and the amount of payment to the subcontractor is then further based on the approved change order.

The various aspects and embodiments of the present invention are described in detail below.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which:

FIG. 6 is an exemplary web page showing a schedule of values, according to an aspect of the present invention;

FIG. 8 is a flowchart depicting an exemplary process by which a subcontractor creates an application for payment, according to an aspect of the present invention;

FIG. 9 is an exemplary web page for submitting a subcontractor application for payment, according to an aspect of the present invention;

FIG. 10 is a flowchart depicting an exemplary process by which a contractor creates an application for payment, according to an aspect of the present invention;

FIG. 11 is an exemplary web page for submitting a subcontractor application for payment, according to an aspect of the present invention; and FIG. 12A-12C are exemplary spread sheets indicating corresponding application for payment submissions by a subcontractor and a general contractor, according to an aspect of the present invention.

DETAILED DESCRIPTION OF EMBODIMENTS

As stated above, the present invention is directed to efficiently administering a construction contract using a server accessible by the parties to the contract and/or the project participants over a data network, such as the Internet. The contract schedules, as well as the requests for payment based on performance of work in accordance with the schedules, are provided over the Internet, from any client capable of interfacing with the Internet.

Figure 1:
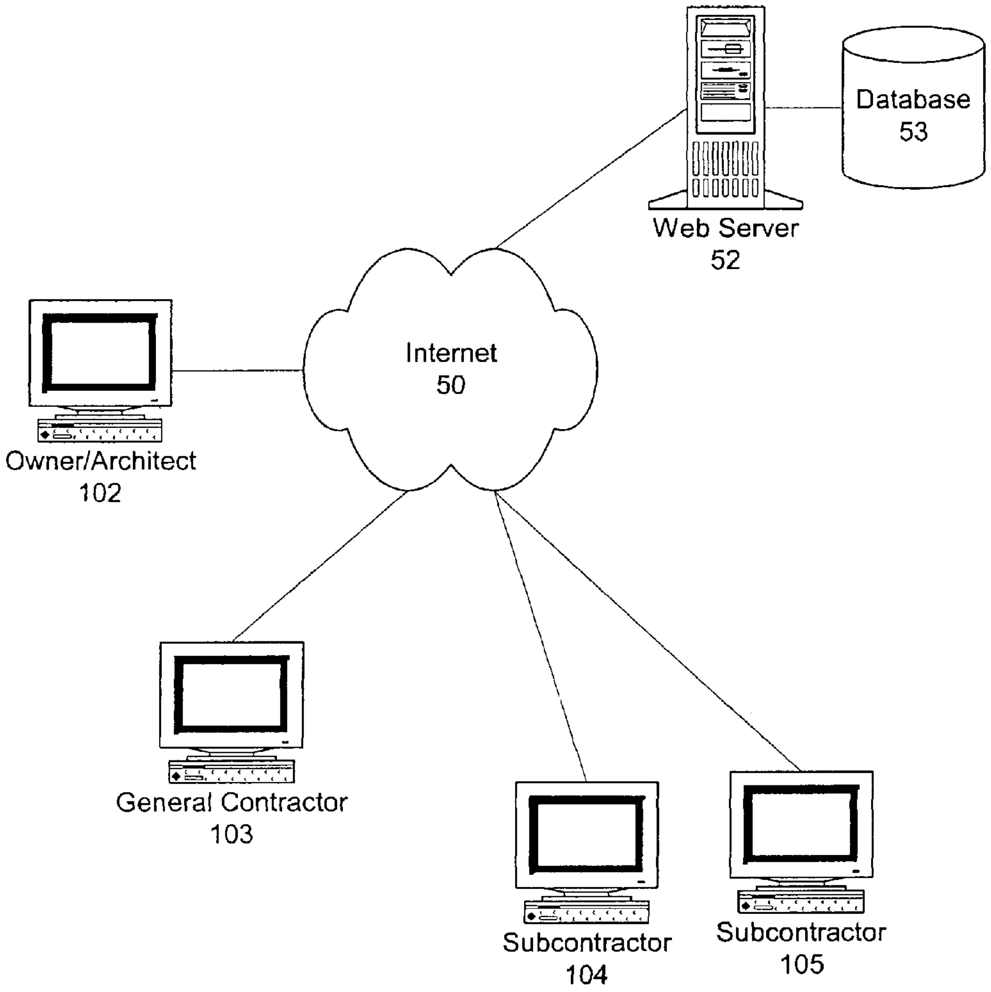
FIG. 1 is a block diagram showing an exemplary network of web clients accessing a common web server, according to an aspect of the present invention.

FIG. 1 depicts an exemplary network of users according to an embodiment of the present invention. The parties to the contract and the project participants are depicted as web clients for the owner/architect 102, the general contractor 103, and the subcontractors 104 and 105. Each of the web clients 102-105 communicates with a web server 52 over a packet switched data network, such as a public Internet 50. The web server 52 has an associated database 53, which may be internal to the web server 52 or a separate database. It is understood that the invention may be implemented over any common data network accessible by the project participants without departing from the spirit and scope of the present invention.

Software implementing the contract administration program resides on the web server 52. In an embodiment of the invention, the software is GCPay®, available from Hart Business Solutions. The software may be based on any known programming languages and techniques, including object oriented programming, that enables the web server 52 to reliably interface with the web clients 102-105 and to execute the steps of the contract administration program that is the subject of the present invention. The web server 52 may operate running any known operating system and associated software, including, for example, the Linux or Microsoft Windows operating system and the Apache web server software, available from the Apache Software Foundation, or the Jigsaw web server software, available from World Wide Web Consortium (W3C).

Each of the depicted web clients 102-105 includes a graphical user interface that incorporates a web browser, such as Microsoft Internet Explorer, available from Microsoft Corporation, or Netscape Navigator, available from Netscape Communications Corporation. The web clients 102-104 may be any device capable of communicating over the Internet, such as a personal computer (PC), a personal digital assistant (PDA), an Internet compatible wireless telephone, or the like. In an exemplary embodiment, the web clients 102-105 are implemented with IBM Pentium based PCs, running the Linux operating system, available from, for example, Free Software Foundation, Inc., or the Microsoft Windows operating system, and running web browser software, such as Microsoft Internet Explorer, Netscape Navigator or HotJava, available from Sun Microsystems, Inc. The web clients 102-105 do not require special software to interact with the web server 52, other than the conventional web browsers.

Typically, the general contractor takes the lead in administering a contract. The general contractor must fulfill numerous obligations with respect to the contract, including developing the initial proposal for performing the project, executing a general contract with the owner, retaining and managing subcontractors, overseeing contract performance, managing change order requests, periodically submitting requests for payment and interfacing with the owner and/or architect throughout performance of the contract. Accordingly, it is anticipated that the general contractor would be the entity responsible for initiating and implementing the contract administration program of the present invention. Therefore, the flowcharts discussed below are directed to the process as implemented by the general contractor, although any other party may initiate and implement the process without departing from the spirit and scope of the present invention.

Figure 2:
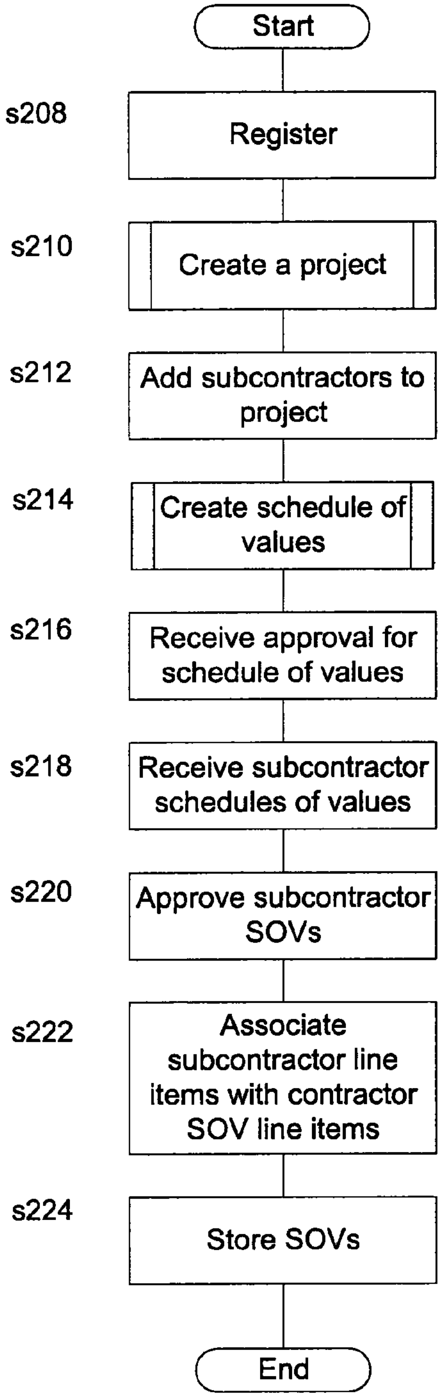
FIG. 2 is a flowchart depicting an exemplary process by which the general contractor initiates a project and establishes the schedules of value, according to an aspect of the present invention.

FIG. 2 is of flowchart depicting an exemplary process by which the general contractor initiates a project and establishes the schedule of values governing contract performance. As stated above, the process is implemented pursuant to a computer program executed at the web server 52. At step s208, the general contractor registers with the contract administration program at the web server 52. The general contractor simply accesses the Internet 50 from the general contractor web client 103 and enters the domain name for a web site operated at the web server 52, such as www.gcpay.com. The general contractor web client 103 and the web server 52 interact through the Internet 50 in a known manner. For example, in an embodiment of the invention, logic is executed by the web server 52, which is accessed over the Internet 50.

The information received by the web server 52 is responsive to prompting by the web server 52, which is programmed in a form reasonably calculated to elicit the desired information. For example, the web server 52 may display a table or form having blank fields that the general contractor fills in based on the identity of each field. Alternatively, the web server 52 may be programmed to request information through discrete fields consecutively displayed in a succession of web pages.

The registration process initially involves registering the general contractor company, which includes receiving basic information about the general contractor, including, for example, the company name, telephone number, mailing address, federal tax ID number, and the like. Also, the identity of a company administrator is entered. The company administrator has the capability and necessary permission to perform numerous proprietary functions in the contract administration program. For example, in an embodiment of the invention, only the company administrator is able to register the general contractor with the contract administration program, create and delete projects and assign other company permissions, discussed below. Therefore, in an embodiment of the invention, the company administrator is identified through a user ID number and a password, in addition to the company administrator's name, for example. The security measures provide protection from unauthorized access to proprietary contract performance data, although other user permissions are able to access certain sets of data relating to the contract.

After the initial company registration, the general contractor receives a Welcome web page or home page whenever it accesses the web server 52. Users in addition to the company administrator may be added or deleted, together with various levels of permission. For example, the user permissions may include a project manager, a company primary contact, a company auditor and a project creator. The project manager is able to add and remove project users and to edit project information and settings. The company primary contact, which may coincide with the company administrator, has the ability to receive email notifications when project events occur, including submitting and reviewing schedules of values, applications for payment and change order. The project auditor can view audit trails for the project. The project creator has the ability to build and edit new projects. The various user permissions may all be granted to the same person, each to a different person, or any combination of people, according to the company administrator's discretion.

At step s210 of FIG. 2, a user from the general contractor (e.g., the project creator or company administrator, identified above) creates a new project by initially accessing the web server 52 from the general contractor web client 103 over the Internet 50. It is assumed that the general contractor has already been awarded the contract based on a previously submitted bid or proposal, based in part on various bids and proposals submitted by the subcontractors. Therefore, certain contractual terms are set, for example, the overall contract price, the general contractor's percentage mark-up, retainage (if any), procedures for change orders, and other typical contract terms and conditions.

The user creates a new project by selecting a "create new project" button, for example, on an introductory web page of the contract administration program. The web server 52 accordingly transmits a new project web page to the web client 103 to direct the user through the project creation process.

Figure 3:
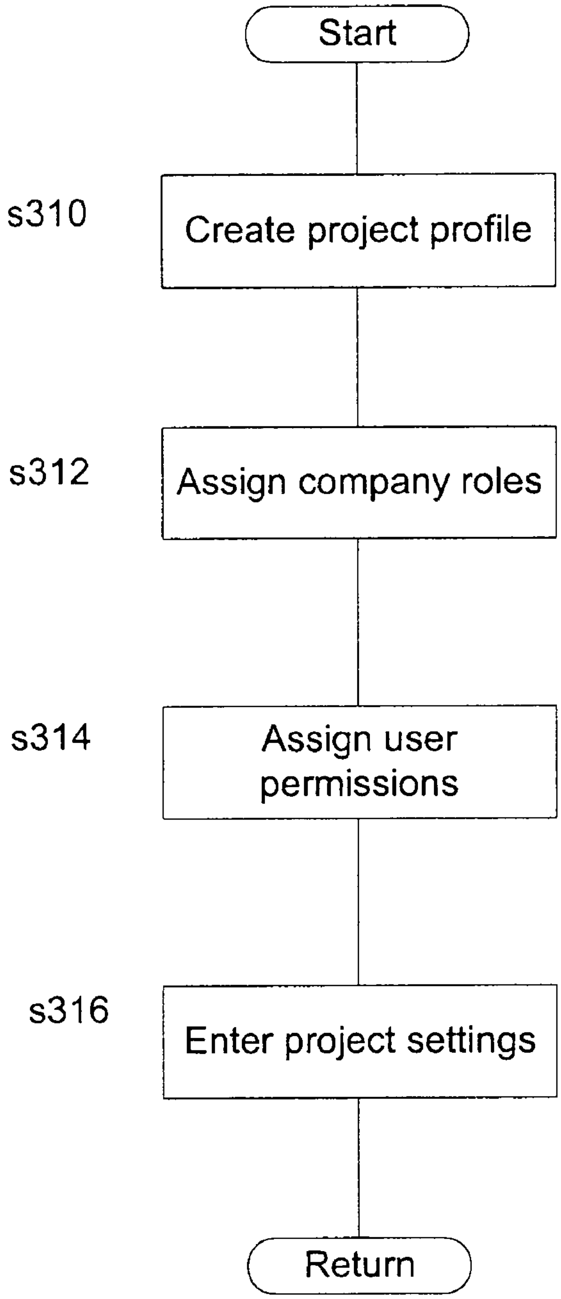
FIG. 3 is a flowchart depicting an exemplary process by which the general contractor creates a project, according to an aspect of the present invention.

In order to create a new project, the general contractor first creates a project profile, as indicated in step s310 of FIG. 3. Creating a project profile is necessary so that the relationships among the project participants are delineated to enable the exchange of information through the web server 52. Creating a project profile entails entering basic information regarding the project. For example, the project profile may include a project name, a project number, a contract start date and the name of the general contractor. The general contractor may have multiple projects which it tracks over the Internet 50 using the contract administration program of the present invention, so the project profile enables the general contractor to distinguish among the various projects.

At step s312, the general contractor user assigns roles to the participants of the project. The project participants are referred to as "companies" for purposes of simplifying the explanation, although it is understood that the project participants may be any legal entity capable of contracting to perform work on the project, including sole proprietors and partnerships. In an embodiment of the invention, at least one company must be assigned to each role of the project, i.e., an owner, an architect and a subcontractor, in addition to the general contractor. In an embodiment of the invention, the owner and the architect are the same company because of the overlap in duties between the two. For example, the architect typically reviews and approves schedules of values, applications for payment and change orders, while the owner typically approves release of funds, although these responsibilities may be handled differently.

Each of the companies assigned a role must exist in the database 53 of the web server 52. In fact, a general contractor may perform multiple projects for the same owner/architect or using the same subcontractors. If a company is not in the database 53, e.g., the company is not registered with the GCPay® service, it must be added or a proxy is created to substitute for the missing company. In alternative embodiments, the company administrator of the general contractor or an administrator of the contract administration program may create the proxy.

In order to create a proxy, the general contractor company administrator, for example, registers the proxy company in the same manner in which a company would register itself with the contract administration program, but marks the company as a proxy. The database 53 stores the name and other information of the company for which a proxy is created. A web page listing, for example, of the project participants indicates each company that is a proxy.

When the general contractor project manager adds the proxy company to the project, the system automatically adds the general contractor's company administrator as the initial project manager of the proxy project company, which is created in the same manner as any normal registered company being assigned to the project by the project manager or other qualified user of the general contractor. The general contractor company administrator may access a listing of proxy companies at the web server 52 from the web client 103, for example. The general contractor company administrator is automatically the company administrator for each of the proxy companies, as well. The company administrator may therefore assign permissions and the like with respect to the other proxy users (e.g., also from the general contractor) for the proxy companies. The assigned users perform all of the functions of the subcontractors corresponding to the proxy companies, based on information supplied by the represented company, typically a subcontractor. When a proxy company needs to become a real company, e.g., the proxy subcontractor eventually subscribes to the GCPay® program, there is handover to the real company, coordinated by the administrator of the contract administration program.

The significance of a proxy from the general contractor point of view is that the general contractor must enter the contract performance data on behalf of the proxied company. For example, a subcontractor that subscribes to and participates in the GCPay service enters performance data directly to the web server 52 from the subcontractor web client 104 or 105. The performance data includes, for example, a schedule of values, applications for payment, change orders and the like, as discussed below. However, a subcontractor that is not registered with the GCPay service provides contract performance data through conventional means, and the general contractor then enters the data into the contract administration program at the web server 52 on behalf of the subcontractor. It is self-evident that the present invention is most efficient whenever all of the project participants are likewise registered with the GCPay service.

The general contractor then assigns user permissions at step s314. Included among the user permissions are company user permissions within each participating company and project user permissions with respect to the overall project. In an embodiment of the invention, the company user permissions include the following: a company administrator, who is able to edit company information and is the first point of contract for automatic email notifications, discussed below; a company primary contact, who is able to receive email notifications; company auditor, who is able to view an audit trail of changes or edits to company information and user information; a company user manager, who is able to edit other users' information within their same company and lock/unlock users from accessing the contract administration program; and a project creator, who is able to create projects.

Only one party to the contract, typically the general contractor, should have a project creator in order to avoid duplicative efforts for one project. Also in an embodiment of the invention, the project user permissions include the following: a project manager, who is able to edit project information, including users, and is the first point of contact for automatic email notifications; a primary contract, who is able to receive email notifications of project events; a project auditor, who is able to view an audit trail of changes or edits to project related information; a schedule of values editor, who is able to create and edit the project schedule of values and change orders, e.g., for the general contractor; an application for payment editor, who is able to create and edit the project applications for payment; a schedule of values reviewer, who is able to review and approve or reject the subcontractors' schedules of values, as well as the general contractor change orders, and an application for payment reviewer, who is able to review and approve or reject the subcontractors' applications for payment.

In an embodiment of the invention, permissions are assigned using a drop-down window of employees of the general contractor. The general contractor selects an employee and then clicks on the project permission categories assigned to the selected employee. The process is repeated for each employee associated with the project. Permission may likewise be removed from employees, for example, by clicking a remove icon next to the user's information. The registered subcontractors or other party to the project is responsible for assigning their respective user permissions.

At step s316, the general contractor finishes creating the project by entering the project settings. The project settings include any administrative items applicable to performance of the contract. For example, under the project settings, the general contractor identifies the company that will review and approve the general contractor's schedule of value, applications for payment and change orders, e.g., the owner and/or the architect. The project settings may be displayed at the general contractor web client 103 as a web page sent from the web server 52. In an embodiment of the invention, the project settings enable the general contractor to determine whether to allow the contract administration program to automatically number line items created by the general contractor in an incrementally ascending order, beginning with the number one. When the general contractor prefers using its own line item numbers, it does not select automatic line item numbering. Another exemplary setting is specifying whether the project includes a variable retainage or a fixed retainage. Variable retainage enables the general contractor to adjust the amount of retainage the owner is able to withhold over the course of the project, typically reducing the retainage nearer completion of the project.

After the settings are entered, the web server 52 sends a web page to the general contractor web client 103 showing everything input to create the project for verification. In an embodiment of the invention, the general contractor is allowed to correct any wrong entries by clicking on a "fix" button, for example. Otherwise, the user clicks on a "create project" button, for example, to accept and program into the contract administration program all of the entered data for the new project. The settings are accordingly stored by the database 53 in association with the project.

Once the project is created, the general contractor is able to access a project web page listing all of the created projects by name or other unique identifier. The general contractor is therefore able to access data on any of its projects by simply clicking on the appropriate icon, retrieving a project detail web page corresponding to the selected project.

At step s212 of FIG. 2, the general contractor adds subcontractors to an existing project. For example, at the project detail web page, the general contractor selects a company role management icon, which causes the web server 52 to display the company role management web page at the general contractor web client 103. The company role management web page displays the existing companies and associated roles, e.g., architect, owner and subcontractor, previously entered by the general contractor at step s312 of FIG. 3. When needed, the general contractor may select a button for adding a subcontractor, or other company, and is queried to enter the name and other information relating to the new subcontractor.

When a new subcontractor is already in the database 53, e.g., the subcontractor has been used on another project and was previously entered into the database 53 when assigning company roles, the general contract may simply identify the subcontractor by name or other identification information. In an embodiment of the invention, the company role management web page includes a drop-down window of all companies and associated roles in the database 53, including subcontractors from all projects, so that the general contractor is able to add a subcontractor to the present project by selecting the desired subcontractor from the subcontractor drop-down window. For example, the general contractor clicks a box next to the desired subcontractor and then associates the selected subcontractor with the present project. Once the new subcontractor is selected, and the subcontractor's company information added to the database 53, if necessary, the general contractor saves the information in association with the project. Of course, new subcontractors, as well as other companies associated with the project, may be added to the project using any variations of the web screens and/or associated commands retrieved from the web server 52 without departing from the spirit and scope of the present invention.

Similarly, the general contractor is able to deactivate project participants. For example, the general contractor web client 103 retrieves the project detail web page from the web server 52. The general contractor is then able to select the company role management icon, which displays all of the contract participants, including the subcontractors associated with the project. In an embodiment of the invention, each subcontractor is listed with corresponding "view" and "deactivate" buttons, for example. Clicking on the view button causes the web server 52 to display a web page containing all of the company information relating to the corresponding subcontractor. Clicking on the deactivate button causes the corresponding subcontractor to be removed from the project, although any previous schedule of values, applications for payment and/or change order information is retained in the project history of the database 53. In an embodiment of the invention, once a subcontractor's schedule of values has been approved, it can no longer be simply removed from the project, and must be deactivated, as described above.

Figure 4:
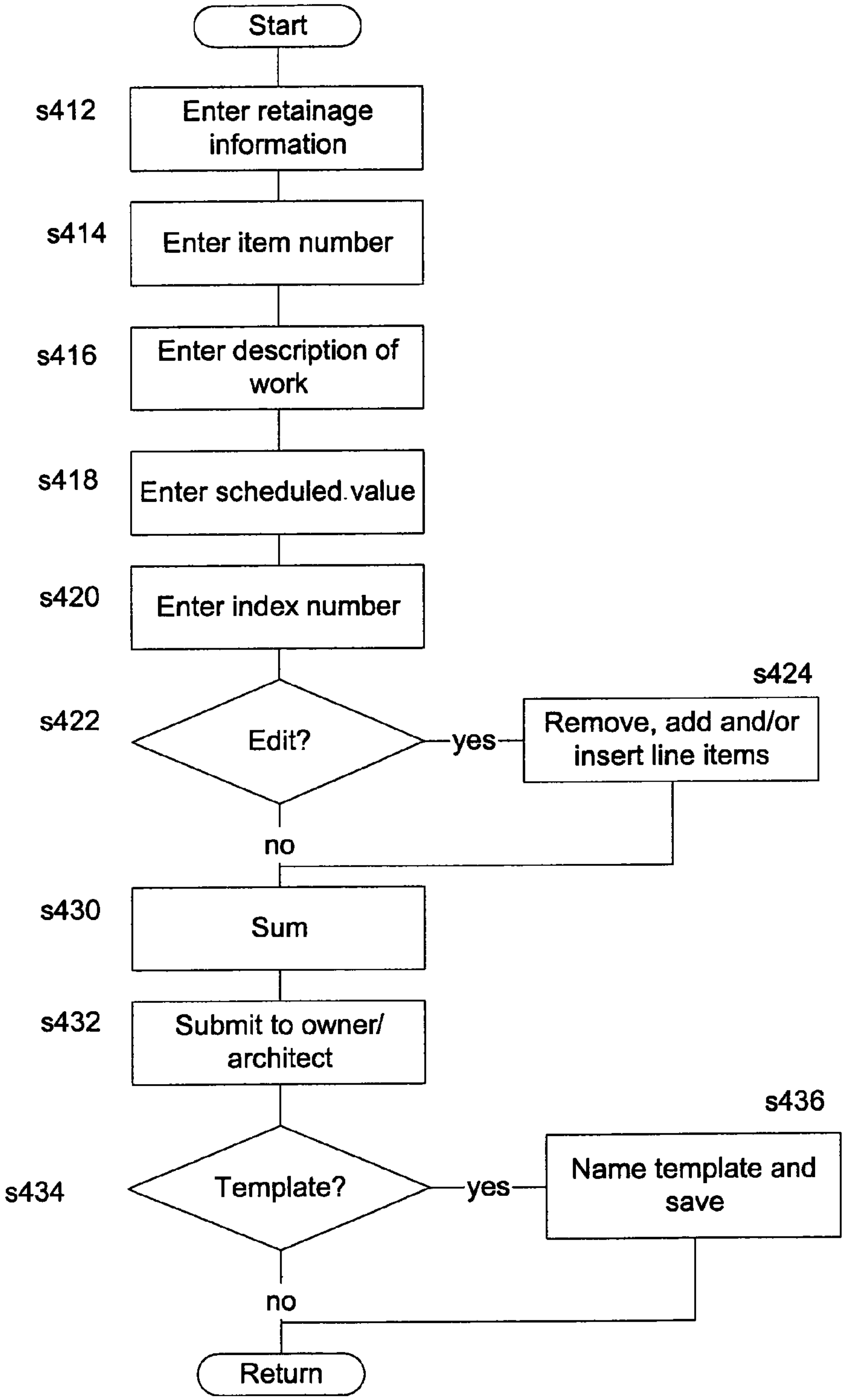
FIG. 4 is a flowchart depicting an exemplary process by which the general contractor creates a schedule of values, according to an aspect of the present invention.

At step s214, the general contract creates the original schedule of values for the project. In an exemplary embodiment, the general contractor retrieves the project detail web page from the web server 52 at the general contractor web client 103. The general contractor then selects an indication of creating a schedule of values for the project, such as a button labeled "create SOV." Initially, a web page is displayed requesting general information regarding the contact, including percentages of retainage for stored materials and completed work, the maximum retainage limit and the number of lines needed for the general contractor's original schedule of values. The retainage amounts are negotiated and agreed upon by the owner and the general contractor pursuant to the general contract. The percentage of retainage for stored materials and completed work, as well as the maximum retainage limit are entered by the general contractor at step s412 of FIG. 4, which is a flow diagram of creating the general contractor's schedule of values.

Figure 5:
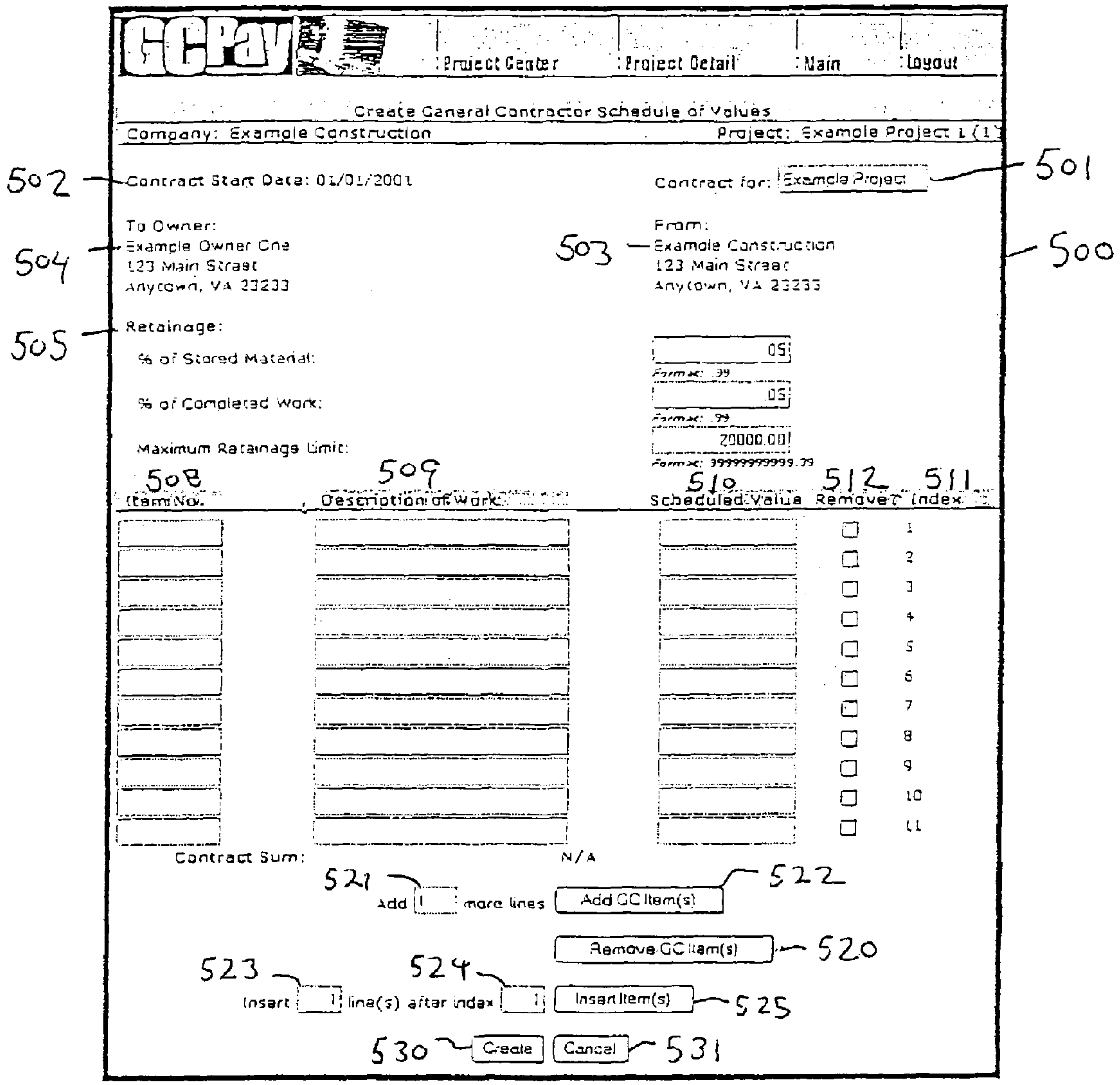
FIG. 5 is an exemplary web page for creating a schedule of values, according to an aspect of the present invention.

The general contractor clicks a "create" button, for example, in response to which the web client 103 displays a general contactor schedule of work web page received from the web sever 52. FIG. 5 provides an example of the general contractor's schedule of values web page 500, according to an embodiment of the present invention. The web page 500 includes basic contract information, such as the name of the project 501, the start date 502, the general contactor's name and address 503 and the owner's name and address 504. The web page also displays the retainage information 505 entered by the general contractor at step s412. In the exemplary embodiment, the stored material retainage is five percent, the completion of work retainage is five percent and the maximum retainage limit is $20,000. In other words, for each application for payment submitted by the general contractor during performance of the project, the owner respectively retains five percent of each value submitted for stored materials and completed work, up to a total of $20,000 over the life of the contract. The retainage is released upon completion of the project and acceptance of the work by the architect and/or owner.

Below the contract information are rows of blank fields corresponding to line items, the number of which was previously identified by the general contractor, as described above. In the exemplary embodiment shown in FIG. 5, each line item includes four columns of information: item number 508, description of work 509, scheduled value 510 and index 511. At step s414 of FIG. 4, the general contractor enters the item number 508, which is a free form field that accepts any combination of alpha or numeric characters corresponding to the particular line item. Alternatively, the general contactor may select automatic numbering, in which case each item number 508 is filled automatically with incremental, ascending numbers.

The contractor enters the description of work 509 at step s416, which is a free form field that accepts any combination of alpha or numeric characters descriptive of the line item. Examples of entries for description of work 509 include "carpeting—labor," "carpeting—materials," "drywall—labor," "drywall—materials," HVAC—labor," "HVAC—materials," "plumbing—labor," plumbing—materials," and the like. At step s418, the general contractor enters the scheduled value 510 corresponding to the description of work. The scheduled value 510 is a numeric field that accepts a dollar amount scheduled for the particular line item. The format is entered, for example, as xxxxxxx.xx, which is interpreted by the program as $x,xxx,xxx.xx.

The index number 511, entered at step s420, is simply an incremental, numerical index of each line item, provided automatically in an embodiment of the invention. The index number 511 enables quick and efficient indexing of the various line items, without reference to the item numbers 508. For example, the item numbers 508 are typically coded by specialty, such as 300+ for finishing work, 400+ for HVAC work, 600+ for electrical work and 700+ for plumbing work. The incremental index numbers 511, however, identify each line item incrementally as it appears in the list of line items with no consideration of the specialty.

At step s422, the general contractor determines whether to edit the schedule of values. For example, the web page 500 depicts a fifth column, remove 512, which enables the general contractor to remove the corresponding line item by marking the box and clicking the "remove items" button 520 at step s424. New line items may also be added to the end of the list by entering the number of line items to be added in box 521 and clicking the "add items" button 522. To insert line items between existing line items, the general contractor enters the number of line items to be inserted in box 523, identifies the index number of the line item after which the new line items are to be inserted via box 524 and clicks the "insert items" button 525, for example. When the general contractor clicks on the cancel button 531, all of the entries are deleted.

After all of the line items for the general contractor's original schedule of values have been entered, the general contactor clicks on the create button 530. The result is a completed schedule of values, an example of which is shown in web page 600 of FIG. 6. The contract administration program at the web server 52 calculates the contract sum at step s430 by adding each entry in the scheduled value 510 column of FIG. 5 and displays the result as the contract sum 610 in web page 600.

At step s432, the general contractor submits the original schedule of values to the owner over the Internet 50, for example, by selecting the submit button 612 on the web page 600. For example, the schedule of values is stored in the database 53 and subsequently accessed by the web server 52 for display at the owner/architect web client 102. A box for comments 614 may also be provided on the web page 600, enabling the general contractor to elaborate on any line items requiring further explanation.

In an embodiment of the invention, the web server 52 generates an email, including the comments, and sends the email over the Internet 50 to the owner/architect web client 102 to notify the owner and/or architect that the schedule of values has been submitted and to seek approval of the comments. In an embodiment of the invention, the email received by the owner and/or architect includes the URL of the web server 52 in a link, so that they may access the web server 52, and the contract administration program, by simply opening the link in the email. The owner and/or architect may then review the general contractor's schedule of values.

Once the schedule of values has been submitted for approval, the general contractor cannot make changes pending approval. This includes not being able to add or remove subcontractors. Once the schedule of values is approved the general contractor may add or remove subcontractors as discussed above, or seek to change the schedule of values itself by submission of change orders, discussed below.

In the depicted embodiment of the invention, the general contractor may elect to store the completed schedule of values as a template at step s434. For example, when the schedule of values is similar to that of other projects or anticipated projects, saving the schedule of values as a template saves time and effort in the other projects. At step s436, after submitting the schedule of values to the owner and/or architect, the general contractor may enter a template name in a field provided on the redisplayed web page. The template name describes the type of project for which the template is useful, for example, school construction, hospital construction, or the like. The general contractor then saves the template at step s436 to instruct the web server 52 to save the schedule of values, e.g., in the database 53, as a template for future reference. In this embodiment of the invention, the initial general contactor schedule of work web page 500 may include a button labeled “choose template” (not pictured), which enables the general contractor to select a previously stored template, e.g., from a drop-down window, and customize the selected template as necessary for the schedule of values on the new project.

In an embodiment of the invention, the general contractor (as well as the subcontractors) may create a template prior to creating a schedule of values for a particular project. The line items for the template are created and edited in essentially the same manner as described above with respect to creating a schedule of values. Accordingly, the general contractor can build subsequent schedules of values relating to various projects based on the stored template.

Regardless of whether the schedule of values is saved as a template, the process returns to FIG. 2, with respect to approval of the schedule of values. The owner and/or architect review the schedule of values, submitted via the Internet 50. In an embodiment of the invention, the owner and/or architect accesses the web server 52 from the owner/architect web client 102 over the Internet 50 upon receiving notice by email that the schedule of values has been submitted. When the owner and/or architect approves the schedule of values, the owner and/or architect clicks on an approve button, for example, displayed along with the submitted schedule of values on a web page at the web client 102. The general contactor receives notice of the approval at step s216. In an embodiment of the invention, the general contractor receives notice of approval by email, generated by the contract administration program, via the Internet 50. When the owner and/or architect reject the schedule of values, a notice to that effect is sent to the general contractor. No applications for payment or change orders may be submitted until an approval for the schedule of values is received.

At step s218, the general contractor receives the schedules of values from the various subcontractors assigned to the project. Using the web client 103, the general contractor accesses the web server 52 and retrieves the project detail web page. The general contractor clicks on a box labeled “view submitted schedule of values,” for example. The web client 103 displays an overview web page of the submitted schedules of values received from the web server 52. The web page lists all of the subcontractors that have submitted a schedule of values, along with the status of each schedule of values, e.g., submitted, viewed, approved or rejected. The overview may also include a subcontract sum, which is the total amount of the submitted subcontract based on the schedule of values.

With respect to the status, “submitted” indicates that the subcontractor has submitted its schedule of values over the Internet 50 to the web server 52, so it is available for the general contractor’s review, but the general contractor has not yet looked at the submission. “Viewed” indicates that the general contractor has accessed the web server 52, retrieved the submitted schedule of values for viewing at least once, but has not yet decided to approve or reject the submission. “Approved” indicates that the general contractor has reviewed and approved the corresponding subcontractor’s submission. In an embodiment, once the general contractor approves a schedule of values, the state cannot be changed, so any corrections would need to be made by a change order. Therefore, it is to the general contractor’s benefit to associate the line items from the subcontractor’s schedule of values with the line items from the general contractor’s schedule of values, discussed below with respect to step s222, prior to approving the schedule of values to assure that any inconsistencies are addressed prior to final approval. “Rejected” indicates that the subcontractor’s submission is unacceptable. If the general contractor had previously associated any line items from the subcontractor’s ultimately rejected schedule of values with the line items from the general contractor’s schedule of values, these lines are automatically disassociated upon rejection.

The overview web page of the submitted schedules of values may also identify the subcontracted representative who submitted and the general contractor representative who reviewed each of the schedules of values. In an embodiment, when the subcontractor is represented by a proxy company, the overview web page indicates the representative of the general contractor who entered and submitted the schedule of values for the proxy company on behalf of the subcontractor. Accordingly, a schedule of values may be submitted and approved by the same person. As discussed above with respect to step s312 of FIG. 3, the general contractor’s representative is previously assigned a role within the general contractor having authority to approve subcontractor schedules of values, e.g., the SOV reviewer.

In response to the general contractors request to review a selected schedule of values, the web server 52 sends the selected schedule of values, previously submitted by the associated subcontractor (and stored in the database 53) to the web client 103. In an embodiment of the invention, the subcontractor’s schedule of values is prepared and submitted in the same general manner as the general contractor’s schedule of values, discussed above with respect to FIGS. 4 and 5. Of course, there are differences in the line items because the subcontractors limit their respective schedules of values to their subcontract specialties. Also, the subcontractors provide significantly more detail for the performance of the work under the subcontracts, requiring the general contractor to associate line items from each subcontractor’s schedule of values with the appropriate line items from the general contractor’s schedule of values, as discussed below with respect to step s222.

Upon review, the general contractor may accept or reject the submitted schedule of values, e.g., by clicking on respective indications, or simply exit the subcontractor schedule of values web page. In an embodiment of the invention, the subcontractor is notified by email of whatever action the general contractor takes through the Internet 50. For example, the subcontractor may receive an email at the subcontractor web client 104 stating that “your schedule of values has been approved,” “your schedule of values has been rejected,” or “your schedule of values has been viewed.” Further, the subcontractor is able to access the program to check the status of the approval, which information is available from the web server 52 over the Internet 50 at any time. The general contractor is also able to include comments regarding the subcontractor’s schedule of values, which likewise may be included in the status email sent to the web client 104.

At step s222 of FIG. 2, the general contractor associates the line items of the subcontractor’s schedule of values with the line items of the general contractor’s schedule of values. Association with the general contractor’s line items is necessary so that the contract administration program is able to automatically determine payment amounts in applications for payment, for example, based on a contract administration algorithm, discussed below. From the general contractor's schedule of values web page, the general contractor views the line items and associated values of the schedule of values submitted to the owner/architect. In an embodiment of the invention, the general contractor then opens an unassociated items window, within the schedule of values web page, which displays all line items from all subcontractor schedules of values that have been submitted for the project that have not yet been associated with general contractor line items.

Figure 7:
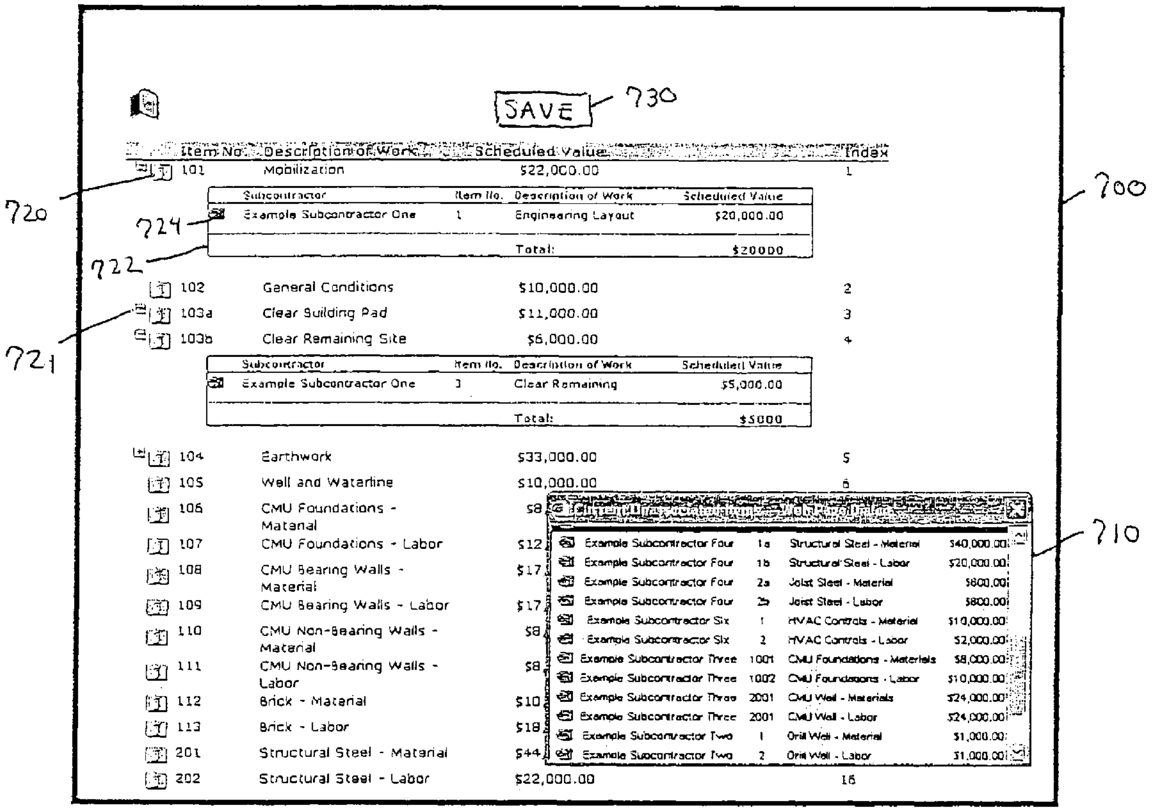
FIG. 7 is an exemplary web page for associating subcontractor schedules of values with a general contractor schedule of values, according to an aspect of the present invention.

As shown in FIG. 7, an unassociated items window 710 can be opened, resized and dragged anywhere on the general contractor schedule of values web page 700, enabling the general contractor to directly compare the various subcontractor line items with the general contractor line items without have to open and close the associated web pages. In an embodiment of the invention, a subcontractor line item is associated with a general contractor line item by clicking on the subcontractor line item, holding down on the left mouse button and dragging the item to a folder icon 720, for example, associated with the desired general contractor line item. The association is completed by releasing the mouse button. Alternative embodiments incorporate any method of efficiently associating the two sets of line items without departing from the spirit and scope of the present invention. The associated subcontractor and general contractor line items are stored in the database 53 at step s224, for example, by clicking on a "save" button 730 on the web page 700.

In the depicted exemplary embodiment, a + icon 721 or other positive indicator appears in order to indicate successful association of the subcontractor line item with the general contractor-line item. Clicking on the + icon opens an associated line items window 722 corresponding to the general contractor line item. Each of the associated line items in the open associated line items window 722 has a corresponding folder 724. To remove an association, the general contractor clicks on the folder 724, holds down the left mouse button and drags the folder (and/or line item) back to the window of unassociated line items 710. Releasing the mouse button completes the removal. The process is repeated until all of the line items of the subcontractor schedules of values, which the general contractor wishes to incorporate into its schedule of values, are associated with the general contractor's line items.

Once the schedules of values are created, associated and approved, the subcontractors may submit change order requests to the general contractor, and the general contractor may submit change order requests to the owner/architect, over the Internet 50 to the web server 52. Change order requests seek alterations to the respective submitted and approved schedules of values to reflect a change in performance of work on a contract. Typically, change order requests seek compensation for additional work performed, materials procured or other unanticipated expenses. However, change orders may also request a reduction in compensation based on work or materials that is determined to be unnecessary in the course of the project.

A subcontractor builds a change order by first retrieving a list of current change orders from the web server 52, to be displayed at the subcontractor web client 104 or 105, for example. The new change order may be included in an existing change order that has not yet been approved, or provided as a separate change order. Also, unapproved change orders may be edited or deleted at any time.

To create a change order, the subcontractor enters data identifying the item number of the subcontractor's schedule of values, with which the change order is associated. However, the change order may also identify a new item number to the extent it involves work that is not readily associated with the existing subcontractor line items. The subcontractor also enters a description of the additional work, e.g., "additional building pad work," and the scheduled value of the change order, e.g., $3,000.00. The change orders are numbered incrementally. As in the case of the schedules of values, the contract administration program enables the subcontractor to enter comments about the change order to be submitted along with the change order. The subcontractor clicks on a "submit to owner" button, for example, to send the change order to the web server 52, which stores the change order in the database 53 and generates an email to the general contractor at the web client 103 informing of the submitted change order.

The general contractor, in turn, incorporates the subcontractor change order into a general contractor change order and submits the general contractor change order to the owner/architect in the same manner described above. In an embodiment, the general contractor may incorporate more than one subcontractor change order into a general contractor change order, in which case the general contractor change order includes a list of the associated subcontractor change orders.

The general contractor reviews and approves or rejects the subcontractors' change orders in much the same manner it reviews and approves or rejects the subcontractors' schedules of values. For example, the general contractor associates the line items of a subcontractor's change order with the line items of the general contractor's schedule of values. The general contractor submits the change order, sending it to the web server 52. The web server 52 stores the change order in the database 53 and generates an email to the owner/architect at the web client 102 informing of the submitted change order.

The owner/architect reviews the change order and determines whether to accept or reject it. Data indicating the decision is stored in the database 53 and sent by email to the general contractor at the web client 103. When the general contractor receives notice of approval, the general contractor approves the corresponding subcontractor's change order. Likewise, data indicating the approval is stored in the database 53 and sent by email to the appropriate subcontractor at the web client 104 or 105.

Once the original schedules of values are created, associated and approved, the general contractor and subcontractors are able to begin submitting applications for payment over the Internet 50 to the web server 52. Of course, the original schedule of values is updated throughout the course of project performance based on approved change orders, described above. Typically, the general contractor does not submit an application for payment until it has received a number of applications for payment from the subcontractors. Accordingly, the subcontractors' applications for payment are addressed first.

Referring to FIG. 8, a subcontractor cannot submit an application for payment until it has received approval of its schedule of values from the general contractor at step s810. As stated above, the subcontractor automatically receives notice that its schedule of values has been approved by email over the Internet 50. Also, the subcontractor may access the contract administration program at the web server 52 from the web client 104 or 105 at any time to check the status of the approval.

Once approval is received and work on the project commences, the subcontractor periodically creates applications for payment. The timing of the applications for payment are generally governed by the subcontract and may include, for example, submitting an application weekly, monthly or upon completion of predetermined project milestones. The subcontractor accesses the web server 52 from the web client 104 or 105 and retrieves a web page at step s812 designed to elicit information regarding the status of the work performed on the project, an example of which is web page 900 of FIG. 9.

The initial application for payment is based on the approved schedule of values. Therefore, before entering any amount to be billed under the subcontract, the application for payment must be edited to include any change orders sought by the subcontractor. At step s814, the subcontractor determines whether any change orders have been submitted to the general contractor since work began. When change orders have been submitted, and approved, the subcontractor decides which, if any, change orders to include in the present application for payment at step s816. Any change orders not included may be submitted in subsequent applications for payment. The line items corresponding to the change orders are automatically updated to reflect the subject matter of the change orders at step s818.

After the line items are updated, or when no approved change orders exist, the subcontractor begins building the application for payment. Referring to the web page 900, the subcontractor enters basic information at step s819 to track the application, including, for example, the application number 901, the application date 902 and the time period 903 covered by the application. In an embodiment of the invention, these fields are completed automatically by the contract administration program, along with the identification of the subcontractor submitting the application, the name of the project, the contracting parties and the like.

At step s820, the subcontractor enters the work completed and the material stored. The subcontractor uses the fields provided on the web page 900 to accurately track the progress of the subcontract performance. For example, columns A, B and C are the item number 910, the description of work 911 and the scheduled value 912, which respectively match the line item numbers, descriptions of work and scheduled values assigned by the subcontractor in its schedule of values (and modified by any approved change orders selected by the subcontractor in step s816).

Columns D and E show the work completed 913 by the subcontractor during the period covered by the application for payment. The work completed 913 is divided into work completed—from previous application 915 and from this period 916. Because the exemplary application for payment is the initial application for payment, the work completed from previous application 915 is all zeros. The work completed—this period 916 shows the amount of work performed in dollars. For example, for line item 1001 (CMU foundations—materials), $800 has been expended of the $8,000 allocated for that line item, and for line item 1002 (CMU foundations—labor), $1,000 has been expended of the $10,000 allocated.

Column F of the web page 900 shows the materials presently stored 917. This column contains the dollar amount of materials purchased by the subcontractor and stored, e.g., on site, but not yet incorporated into the project. In the present example, none of the line items include an amount for materials stored. The subcontractor indicates when it finishes entering the work completed and the materials stored, for example, by clicking a "re-calculate fields" button on the web page 900 (not pictured).

At step s824, the contract administration program calculates the remaining entries of the web page 900. For example, column G shows the total dollar amount associated with each line item, including the total work completed 913 (i.e., the sum of the work completed—from previous application 915 and the work completed—this period 916) and the materials presently stored 917 for each line item. Column G also includes the percentage 919, showing the percentage of completion based on a comparison of the total completed and stored to data 918 with the scheduled value 912. For line items 1001 and 1002, 10 percent of the scheduled value is included in this application for payment. Column H, balance to finish 920, shows the remaining amount of the scheduled value to be performed by the subcontractor for each line item.

In the row showing grand totals 930, the totals for each line item are automatically determined for each of the columns. One exception is the column for percentage 919, which does not show the total percentages. Rather, the percentage 919 for the grand total 930 shows the percentage of the total work completed 918 to the total scheduled value 912.

In an embodiment of the invention, the subcontractor indicates whether the general contractor is allowed to make modifications to the application for payment by clicking on the YES/NO radio buttons 931. By agreeing to allow the general contractor to make modifications, the subcontractor may expedite approval of the application for payment, as well as the subsequent general contractor application for payment, in which the subcontractor's application is included. The subcontractor can also enter explanations of charges, give status reports or the like in the comments window 932.

The subcontractor submits the application for payment to the general contractor at step s826, for example, by clicking on the "submit to owner" button 933. The application for payment is stored at the database 53 by the web server 52 for the general contractor to review. As with the schedules of values, the web server 52 also generates and sends an email to the general contractor at the web client 103 to inform the general contractor that a new application for payment has been submitted.

In an embodiment of the invention, the subcontractor's application for payment cannot be approved unless all of the previous applications for payment have been approved. Also, as stated above with respect to schedules of value, once an application for payment has been approved or rejected, its state cannot be changed, so the general contractor should not approve the subcontractor applications for payment until after it receives approval for the general contractor application for payment in which the subcontractor applications are incorporated. Once an application for payment has been rejected, all subsequent applications for payment from the same subcontractor are also rejected. Similar to the subcontractor schedules of values, the applications for payment submitted to the general contractor have one of four statuses: submitted, viewed, approved and rejected. In an embodiment of the invention, the subcontractor receives an email from the web server 52 whenever the general contractor views, approves and/or rejects each submission.

The general contractor's application for payment to the owner/architect is similar to that of the subcontractor's application for payment to the general contractor. Initially, the general contractor receives an approval of its schedule of values from the owner/architect at step s1010 of FIG. 10. Typically, the general contractor receives the notice at the web client 103 from the web server 52 as an email.

The general contractor determines to submit an application for payment, based on project completion milestones, agreed monthly or weekly submissions, target dates or the like, as indicated in the general contract. The general contractor logs onto the contract administration program at the web server 52 and selects application for payment for the desired project from a project detail web page. At step s1012, the web client 103 retrieves the application for payment form web page from the web server 52 over the Internet 50. An exemplary application for payment web page is depicted as web page 1100 in FIG. 11.

At step s1014, the general contractor determines whether any subcontractor applications for payment have been newly submitted or have not yet been included in a previous general contractor application for payment. If so, the general contractor retrieves a list of subcontractor applications at step s1016 and selects the applications that are to be included in the general contractor's application for payment at step s1018. The general contractor also has self-performed tasks, included in the schedule of values and an application for payment, that do not involve performance of work by a subcontractor.

At step s1020, the general contractor determines whether any change orders have been newly submitted or have not yet been included in a previous application for payment. When there are change orders, the general contractor assures that it has received approval of the change orders from the owner/architect at step s1022, discussed above. The general contractor then selects the change orders, if any, to include in the application for payment at step s1024. Any change orders not included may be submitted in subsequent applications for payment. Also, in an embodiment of the invention, a subcontractor change order cannot be disassociated from a general contractor change order once the subcontractor application for payment that includes the subcontractor change order has been included and submitted in a general contractor application for payment. The line items corresponding to the change orders are automatically updated to reflect the subject matter of the change orders.

After the line items are updated, or when no approved change orders exist, the general contractor begins building the application for payment. Referring to the web page 1100, the subcontractor enters basic information at step s1028 to track the application, including, for example, the application number 1101, the application date 1102 and the time period 1103 covered by the application. In an embodiment of the invention, these fields are completed automatically by the contract administration program, along with the identification of the name of the general contactor, the name of the project, the contracting parties and the like.

At step s1030, the general contractor enters the work completed and the material stored. The general contractor uses the fields provided in the web page 1100 to accurately track the progress of contract performance. For example, columns A, B and C are the item number 1110, the description of work 1111 and the scheduled value 1112, which respectively match the line item numbers, descriptions of work and scheduled values assigned by the general contractor in its schedule of values (and modified by any approved change orders selected by the general contractor in step s1024).

Columns D and E shown the work completed 1113 on the project during the period covered by the application for payment. The work completed 1113 is divided into work completed—from previous application 1115 and from this period 1116. Assuming the exemplary application for payment is the initial application for payment, the work completed from previous application 1115 is all zeros. The work completed—this period 1116 shows the amount of work performed in dollars. For example, for line item 103*a* (clear building pad), $5,500 has been expended of the $11,000 allocated for that line item, and for line item 103*b* (clear remaining site), $6,000 has been expended of the $6,000 allocated. Column F of the web page 1100 shows the materials presently stored 1117. This column contains the dollar amount of materials purchased by the subcontractor and stored, but not yet incorporated into the project. In the present example, none of the line items include an amount for materials stored.

The work completed and the materials stored for each line item, as well as the general contractor's markup, are entered at step s1030 of FIG. 10. Also, at step s1034, the amount previously billed is entered, for example, in column D, from previous application 1115. Unlike the subcontractor applications of payment, the general application for payment includes the general contactor's markup. For example, the $11,000 allocated for line item 103*a* includes an exemplary ten percent markup on the subcontractor's work. In other words, the subcontractor had scheduled $10,000 for this work and the general contractor added a $1,000 markup (ten percent) in its corresponding scheduled value. Likewise, the work completed 1113 for this period 1116 is based on a $5,000 submission from the subcontractor and a $500 markup by the general contractor.

In an embodiment of the invention, the work completed this period 1116 and the materials presently stored 1117 fields are automatically populated by the contract administration program at steps s1030 and s1034 when the general contractor clicks on a button labeled "auto-populate" (not pictured), for example. The program then populates these fields based on information stored in the database 53, such as the general contractor schedule of values, the subcontractor applications for payment, the associated line items, the approved change orders and the like.

The amounts automatically entered, however, are guide values for the general contractor, who may replace any of the automatically populated fields with any figure it desires within the scheduled value amount. For example, the general contractor may want to front-load payments under the contract by billing the owner/architect more than amounts billed by the subcontractor. Whether the general contractor has the right to front-load is typically covered by the terms and conditions of the general contract.

In an embodiment of the invention, the fields are recalculated for each GC line item according to the following algorithm:

$$WC_{(LI)} = \frac{E_{(SC)}}{C_{(SC)} - D_{(SC)}} \times C_{(GC)} - D_{(GC)} \tag{1}$$

Where:

$WC_{(LI)}$=the general contractor line item (from the schedule of values) for which the work completed payment amount is being determined;

$E_{(SC)}$=the work completed in the current period for all subcontractor line items associated with the general contractor line item;

$C_{(SC)}$=the original scheduled value for all subcontractor line items associated with the general contractor line item;

$D_{(SC)}$=the work completed as of the previous application for all subcontractor line items associated with the general contractor line item;

$C_{(GC)}$=the original scheduled value of the general contractor's line item; and $D_{(GC)}$=the work completed as of the previous application for the general contractor's line item.

The work completed calculation divides the work completed for the present period for all associated subcontractor line items by the work remaining for the same subcontractor line items to determine a ratio, $E_{(SC)}/(C_{(SC)-D(SC)})$. The ratio is multiplied by the remaining work of the general contractor, $C_{(GC)}-D_{(GC)}$, to determine the amount that the general contractor should use for work completed this period 1113. Using the remaining work instead of just the original work accommodates the situation in which the general contractor "front loads" its applications for payment, i.e., initially billing the owner at a higher rate than it is actually paying the subcontractor.

Referring to the example depicted in web page 1100 of FIG. 11, the contract administration program determines the amount of work completed this period 1113 for Item number 101, based on the subcontractor application for payment as follows: $E_{(SC)}$=\$10,000; $C_{(SC)}$=\$20,000; $D_{(SC)}$=0; $C_{(GC)}$=\$22,000; and $D_{(GC)}$=0. Note that the subcontractor figures are based on the general contractor figures, less the general contractor's 10 percent markup. Also, since the application for payment of FIG. 11 is an initial application for payment, the work completed as of the previous application for both the subcontractor and the general contractor is "0." Accordingly, the application for payment amount is determined as follows:

$$AFP_{(101)}=10{,}000/20{,}000\times22{,}000=\$11{,}000$$

The contact administration program can also determine the amount of materials stored 1117 included by the general contractor in its application for payment to the owner/architect for each line item. In an embodiment of the invention, the field is calculated for each GC line item according to the following algorithm:

$$MPS_{(LI)}=\frac{F_{(SC)}}{C_{(SC)}}\times C_{(GC)} \tag{2}$$

Where:

$MPS_{(LI)}$=the general contractor line item for which the materials presently stored payment amount is being determined;

$F_{(SC)}$=the stored materials for the current period for all subcontractor line items associated with the general contractor line item;

$C_{(SC)}$=the original scheduled value for all subcontractor line items associated with the general contractor line item; and $C_{(GC)}$=the original scheduled value of the general contractor's line item.

The stored materials calculation divides the materials presently stored for the present period for all associated subcontractors line items by the original scheduled values for the same line items. This ratio is then multiplied by the corresponding original scheduled value of the general contractor to determine the amount that the general contractor should claim for the materials presently stored. There is no "remaining" stored materials, as in the work completed, so factoring a remaining amount is not applicable to determining the materials presently stored.

As stated above, following the guide value for each line item in the general contractor application for payment is discretionary. The general contractor may accept the automatically determined amount, or enter a higher or lower amount. For example, the general contractor may wish to "front load" its applications for payment, initially billing the owner at a higher rate than it is actually paying the subcontractor. Regardless, the contract administration program will apply the algorithms expressed in equations (1) and (2), above, with respect to subsequent applications for payment, resulting in guide values that fully amortize the payment applications to the owner/architect when the subcontractor(s) has been fully paid, even when the general contractor ignores the previous guide values, e.g., when it front-load certain line items.

FIGS. 12A-12C shown portions of exemplary spread sheets in which the general contractor elects to front load its applications for payment, requesting a higher payment in the initial application for payment than has been submitted for the corresponding line item by the subcontractor. FIG. 12A shows three line items from a sample first subcontractor application for payment 1210, indicating in columns E and F, respectively, that the total work completed on the subcontract is \$7,500 and the total materials presently stored is \$2,500. The sample first general contractor application 1230 shows the guide values in columns E and F calculated by the contract administration program in accordance with equations (1) and (2), respectively. Assuming a 10 percent markup, the guide values are determined to be \$8,250 and \$2,750 for the work completed this period and the materials presently stored.

FIG. 12B shows the same three line items from a sample second subcontractor application for payment 1240, indicating in columns E and F, respectively, that the additional work completed on the subcontract is \$11,000 and the total materials presently stored is still \$2,500. The sample second general contractor application 1260 again shows the guide value in columns E calculated by the contract administration program in accordance with equation (1). (Note that the materials presently stored in column F is unchanged.) However, as indicated in column D of the second general contractor application 1260, the general contractor front loaded its previous application by submitting \$12,000, as opposed to the guide value of \$8,250, as the work completed from the previous application. Therefore, the guide value determined according to equation (1) in column E is \$10,266.67. As a result, the total completed and stored to date entry is \$25,016.67, while if the guide value had been followed in the first general contractor application 1230, the total completed and stored to date entry would have been \$23,100.

FIG. 12C shows the same three line items from a sample third subcontractor application for payment 1270, indicating in columns E and F, respectively, that the additional work completed on the subcontract is \$11,500, with no materials presently stored, resulting in 100 percent completion of the work scheduled for those three line items, indicated by the percentage in column G. The sample third general contractor application 1290 again shows the guide values in column E calculated by the contract administration program in accordance with equation (1). As indicated in column D, the general contractor followed the guide value from the previous application and submitted the total work from previous applications as \$22,266.67. Therefore, the guide value determined according to equation (1) in column E is \$10,733.33, which coincides with the remaining amount of work to be performed for the general contractor's line item. Note that the materials presently stored in column F is zero, indicating that the stored material has been used. Accordingly, FIGS. 12A-12C demonstrate that the contract administration program accurately tracks, and recommends appropriate application for payment values, even in the case where the general contractor front loads its billing.

Referring back to FIG. 10, the general contractor indicates that it has finished entering the work completed and the materials stored values by clicking a "re-calculate fields" button (not pictured), for example. At step s1036, the contract administration program calculates the remaining entries of the web page 1100 based on the entered values. For example, column G shows the dollar total amount associated with each line item. Column G includes the total completed and stored to data 118, which includes the sum of the work completed—from previous application 1115, the work completed—this period 1116, and the materials presently stored 1117 for each line item. Column G also includes the percentage 1119, showing the percentage of completion based on a comparison of the total completed and stored to data 1118 with the scheduled value 1112. For line item 103*a* and 103*b*, 50 percent and 100 percent of the scheduled values are respectively included in this application for payment. Column H, balance to finish 1120, shows the remaining amount of the scheduled value to be performed on each project line item.

In the row showing grand totals 1130, the totals for each of the general contractor's line items are automatically determined for each of the columns. One exception is the column for percentage 1119, which does not show the total percentages. Rather, the percentage 1119 for the grand total 1130 shows the percentage of the total work completed 1118 to the total scheduled value 1112. The GC can also enter explanations of charges, give status reports or the like in the Comments window 1132.

The general contractor submits the application for payment to the general contractor at step s1040, for example, by clicking on the "submit to owner" button 1133. The application for payment is stored at the database 53 by the web server 52 for the owner and/or architect to review. As with the schedules of values, the web server 52 also generates and sends an email to the owner/architect at the web client 102 to inform them that a new application for payment has been submitted.

As described above with respect to subcontractor applications for payment, in an embodiment of the invention, the general contractor's application for payment cannot be approved unless all of the previous applications for payment have been approved. Also as stated above, once an application for payment has been approved or rejected, its state cannot be changed. Once an application for payment has been rejected, all subsequent applications for payment from the same subcontractor are also rejected. Similar to the subcontractor applications for payment, the general contractor's applications for payment have one of four statuses: submitted, viewed, approved and rejected.

The owner/architect reviews the general contractor's application for payment, as described above with respect to approval of subcontractor applications for payment. For example, the owner/architect is notified of the pending application for payment by email and logs onto the contract administration program at the web server 52 to retrieve the application. The owner/architect can approve or reject the application for payment, an indication of which is stored in the database 53 for retrieval by the general contractor, as well as emailed to the general contractor at the web client 103. The owner/architect may include comments in the approval or rejection email, such as "check will be mailed on Friday."

In an embodiment, the owner/architect is able to initiate an electronic funds transfer at the web server 52, based on bank account data for the owner/architect and the general contractor stored in the database 53. Likewise, the general contractor may have the ability to pay subcontractors over the Internet 50 using electronic funds transfer.

The process of receiving and accepting applications for payment from subcontractors, and sending applications for payment to the owner/architect, is repeated until work on the contract is complete. Other standard contract provisions, such as time-tables, receipt of permits, project inspections, acceptance of the work, release of retainage amounts and the like, are administered in a conventional manner. However, notices of inspection times and dates, release of retainage amounts, as well as other contract governed events, may be noticed over the Internet 50, e.g., by email, and posted at the associated project web site, since the project participants routinely interact with the centralized web server 52.

Accordingly, the present invention provides administration of a contract, and associated subcontracts, from a centralized web server accessible by all contracting (and subcontracting) parties over a packet switched data network, such as the Internet. Schedules of values, applications for payment and change orders corresponding to the general contractor and the subcontractors are built and submitted to the owner/architect and the general contractor, respectively, by way of the web server. Responsive approvals and rejections are likewise communicated through the web servers. Furthermore, emails are generated automatically to notify the contracting and subcontracting parties of the status of various submissions, as well as other contract and project related communications.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

What is claimed is:

1. A method for administering performance of a project using web server accessible through a packet switched data network, the method comprising:

creating a general contract schedule of values relating to the project, the general contract schedule of values comprising a plurality of general contract line items;

receiving at least one subcontract schedule of values via the packet switched data network, the subcontract schedule of values comprising a plurality of subcontract line items;

receiving associations between the subcontract line items of each subcontract schedule of values and the general contract line items of the general contract schedule of values;

receiving at least one subcontract application for payment via the packet switched data network, the subcontract application for payment including the subcontract line items;

updating the general contract line items at the web server based on information in the associated subcontract line items received in the subcontract application for payment; and creating a general contract application for payment at the web server based on the updated contract line items;

wherein the general contract application for payment automatically determines a total performed work amount and a payment amount due based on the total performed work amount.

2. The method for administering performance of the project according to claim 1, further comprising submitting the general contract application for payment via the packet switched data network.

3. The method for administering performance of the project according to claim 2, further comprising receiving an approval of the general contract application for payment via the packet switched data network.

4. The method for administering performance of the project according to claim 1, further comprising initially creating a project profile and assigning roles to participants, including the at least one subcontractor and at least one of an owner and an architect.

5. The method for administering performance of the project according to claim 4, in which assigning roles comprises selecting at least one of the participants from a database accessible by the web server.

6. The method for administering performance of the project according to claim 4, in which assigning roles comprises identifying a proxy to represent the at least one of the participants, wherein the subcontract schedule of values and the subcontract application for payment are received from the proxy.

7. The method for administering performance of the project according to claim 1, in which the subcontract schedule of values is based on a predetermined template accessible through the packet switched data network.

8. The method for administering performance of the project according to claim 1, in which creating the general contract application for payment is further based on a change order corresponding to at least one of the general contract schedule of values and the at least one subcontract schedule of values.

9. The method for administering performance of the project according to claim 1, in which creating the general contract application for payment includes entering at least one of a work completed amount and a material presently stored amount.

10. The method for administering performance of the project according to claim 9, in which entering at least one of the work completed amount and the material presently stored amount is performed automatically based on the subcontract application for payment.

11. The method for administering performance of the project according to claim 9, in which entering at least one of the work completed amount and the material presently stored amount comprises receiving a dictated amount, different than the at least one of the work completed amount and the material presently stored amount, via the packet switched data network.

12. The method for administering performance of the project according to claim 1, further comprising modifying the received subcontractor application for payment before updating the general contract line items, based on permission to modify the received subcontractor application received via the packet switched data network.

13. The method for administering performance of the project according to claim 1, in which the packet switched data network comprises a public Internet.

14. A non-transitory computer readable medium storing a computer program for administering performance of a contract, the computer program being executed by a computer accessible through a data network, the computer readable medium comprising:

a general schedule of values code segment for enabling creation of a general contract schedule of values relating to the project, the general contract schedule of values comprising a plurality of general contract line items;

a subcontract schedule of values code segment for receiving at least one subcontract schedule of values via the data network, the subcontract schedule of values comprising a plurality of subcontract line items;

an associating code segment for receiving associations between the subcontract line items of each subcontract schedule of values and the general contract line items of the general contract schedule of values;

a subcontract payment application code segment for receiving at least one subcontract application for payment via the packet switched data network, the subcontract application for payment including the subcontract line items;

an updating code segment for automatically updating the general contract line items based on information in the associated subcontract line items received in the subcontract application for payment; and a general contract payment application code segment for creating a general contract application for payment based on the updated contract line items;

wherein the general contract application code segment automatically determines a total performed work amount and a payment amount due based on the total completed work amount.

15. The computer readable medium of claim 14, further comprising:

a project creating code segment for enabling initial creation a project profile and assignment of roles to participants, including the at least one subcontractor and at least one of an owner and an architect.

16. The computer readable medium of claim 15, in which assigning roles comprises selecting at least one of the participants from a database accessible by the computer.

17. The computer readable medium of claim 15, in which assigning roles comprises identifying a proxy to represent the at least one of the participants, wherein the subcontract schedule of values and the subcontract application for payment are received from the proxy.

* * * * *